United States Patent
Yonezawa et al.

(10) Patent No.: US 11,028,492 B2
(45) Date of Patent: Jun. 8, 2021

(54) ELECTROLYTIC SYSTEM, ELECTROLYTIC CONTROL CIRCUIT, AND CONTROL METHOD FOR ELECTROLYTIC SYSTEM

(71) Applicant: FUJITSU LIMITED, Kawasaki (JP)

(72) Inventors: Yu Yonezawa, Sagamihara (JP); Hiroshi Nakao, Yamato (JP); Yoshiyasu Nakashima, Kawasaki (JP); Daiji Yamashita, Bunkyo (JP)

(73) Assignee: FUJITSU LIMITED, Kawasaki (JP)

( * ) Notice: Subject to any disclaimer, the term of this patent is extended or adjusted under 35 U.S.C. 154(b) by 279 days.

(21) Appl. No.: 16/152,447

(22) Filed: Oct. 5, 2018

(65) Prior Publication Data

US 2019/0127867 A1    May 2, 2019

(30) Foreign Application Priority Data

Nov. 2, 2017    (JP) .............................. JP2017-213060

(51) Int. Cl.
    *C25B 15/02*      (2021.01)
    *C25B 1/04*      (2021.01)
    (Continued)

(52) U.S. Cl.
     CPC ............. *C25B 15/02* (2013.01); *C25B 1/04* (2013.01); *H02J 3/385* (2013.01); *H02M 3/33507* (2013.01)

(58) Field of Classification Search
     CPC ............................. C25B 15/02; C25B 1/02–12
See application file for complete search history.

(56) References Cited

U.S. PATENT DOCUMENTS

| | | | |
|---|---|---|---|
| 2006/0065302 A1* | 3/2006 | Gibson | .............. H02S 10/20 136/244 |
| 2010/0114395 A1* | 5/2010 | Hinatsu | .............. C25B 15/02 700/295 |

(Continued)

FOREIGN PATENT DOCUMENTS

| | | |
|---|---|---|
| JP | 2001-335982 | 12/2001 |
| JP | 2004-244653 | 9/2004 |

(Continued)

OTHER PUBLICATIONS

U.S. Office Action dated Sep. 16, 2020 for copending U.S. Appl. No. 15/942,852, 12 pages.

(Continued)

*Primary Examiner* — Nicholas A Smith
(74) *Attorney, Agent, or Firm* — Fujitsu Patent Center

(57) ABSTRACT

An electrolytic system includes, a power generator that outputs a first DC power, a plurality of converters each of which converts the first DC power into a second DC power according to a target duty ratio, and outputs voltage information and current information of the second DC power, a plurality of electrolyzers each of which receives the second DC power output from each of the plurality of converters and generates a gas, a control circuit that outputs control information by which the first DC power approaches a maximum power, based on a voltage value and a current value of the first DC power, and a selection circuit that outputs the target duty ratio, and a selection signal as to whether to select each of the plurality of electrolyzers and each of the plurality of converters, based on the control information and the voltage information and the current information.

17 Claims, 21 Drawing Sheets

(51) Int. Cl.
*H02J 3/38* (2006.01)
*H02M 3/335* (2006.01)

(56) References Cited

U.S. PATENT DOCUMENTS

| | | | | |
|---|---|---|---|---|
| 2015/0021193 A1* | 1/2015 | Verfu | ................... | C25B 15/00 |
| | | | | 205/337 |
| 2016/0060776 A1* | 3/2016 | Kawajiri | .............. | C25B 9/18 |
| | | | | 205/637 |
| 2016/0261141 A1* | 9/2016 | Maeno | ................. | B60L 8/003 |
| 2018/0291516 A1* | 10/2018 | Nakao | ............ | H02M 3/33507 |

FOREIGN PATENT DOCUMENTS

| | | |
|---|---|---|
| JP | 2007-031813 | 2/2007 |
| WO | 2013/046958 A1 | 4/2013 |

OTHER PUBLICATIONS

U.S. Office Action dated Jul. 10, 2020 for copending U.S. Appl. No. 15/942,852, 11 pages.
U.S. Office Action dated Mar. 17, 2020 for copending U.S. Appl. No. 15/942,852, 8 pages.
U.S. Office Action dated Jan. 15, 2020 for copending U.S. Appl. No. 15/942,852, 10 pages.
JPOA—Notice of Reasons for Refusal of Japanese Patent Application No. 2017-076572 dated Oct. 20, 2020 with Machine English translation.

* cited by examiner

FIG. 12A

OPERATING TIME LIST

| DC-DC# | OPERATING TIME (MIN) |
|---|---|
| 1 | 172017 |
| 2 | 163038 |
| 3 | 172523 |
| ... | ... |
| N | 175049 |

FIG. 12B

CELL RESISTANCE LIST

| CELL# | CELL RESISTANCE (mΩ) |
|---|---|
| 1 | 39.7 |
| 2 | 38.6 |
| 3 | 40.2 |
| ... | ... |
| N | 44.2 |

FIG. 12C

USE PRIORITY LIST

| DC-DC# | USE PRIORITY |
|---|---|
| 1 | 2 |
| 2 | 1 |
| 3 | 3 |
| ... | ... |
| N | N |

FIG. 12D

PRIORITY SELECTION PARAMETER LIST

| DC-DC# | PRIORITY SELECTION PARAMETER |
|---|---|
| 1 | 3 |
| 2 | 2 |
| 3 | 0 |
| ... | ... |
| N | -4 |

FIG. 13

| DC-DC# | OPERATING TIME (MIN) | CELL RESISTANCE (mΩ) | USE PRIORITY | PRIORITY SELECTION PARAMETER | USABILITY | CELL TEMPERATURE (°C) | CELL VOLTAGE (V) | CELL CURRENT (I) | ... |
|---|---|---|---|---|---|---|---|---|---|
| 1 | 172017 | 39.7 | 2 | 3 | T | 25.3 | 1.80 | 45.3 | ... |
| 2 | 163038 | 38.6 | 1 | 2 | T | 25.6 | 1.75 | 45.3 | ... |
| 3 | 172523 | 40.2 | 3 | 0 | T | 23.5 | 1.82 | 45.3 | ... |
| ... | ... | ... | | | | | | | ... |
| N | 175049 | 44.2 | N | 4 | F | 20 | 0 | 0 | ... |

FIG. 18

| CALCULATE PRIORITY SELECTION PARAMETER OF EACH CONVERTER ||
|---|---|
| $\Delta x > 0$ | $\Delta x < 0$ |
| WHEN $P_{out} < Pth_{low}$, +1.0 | WHEN $P_{out} > Pth_{high}$, +5.0 |
| WHEN $P_{out} > Pth_{high}$, -2.0 | WHEN $P_{out} < Pth_{low}$, +2.0 |
| WHEN $P_{out}$ IS MAXIMUM VALUE, +1.0 | WHEN $P_{out}$ IS MINIMUM VALUE, +1.0 |

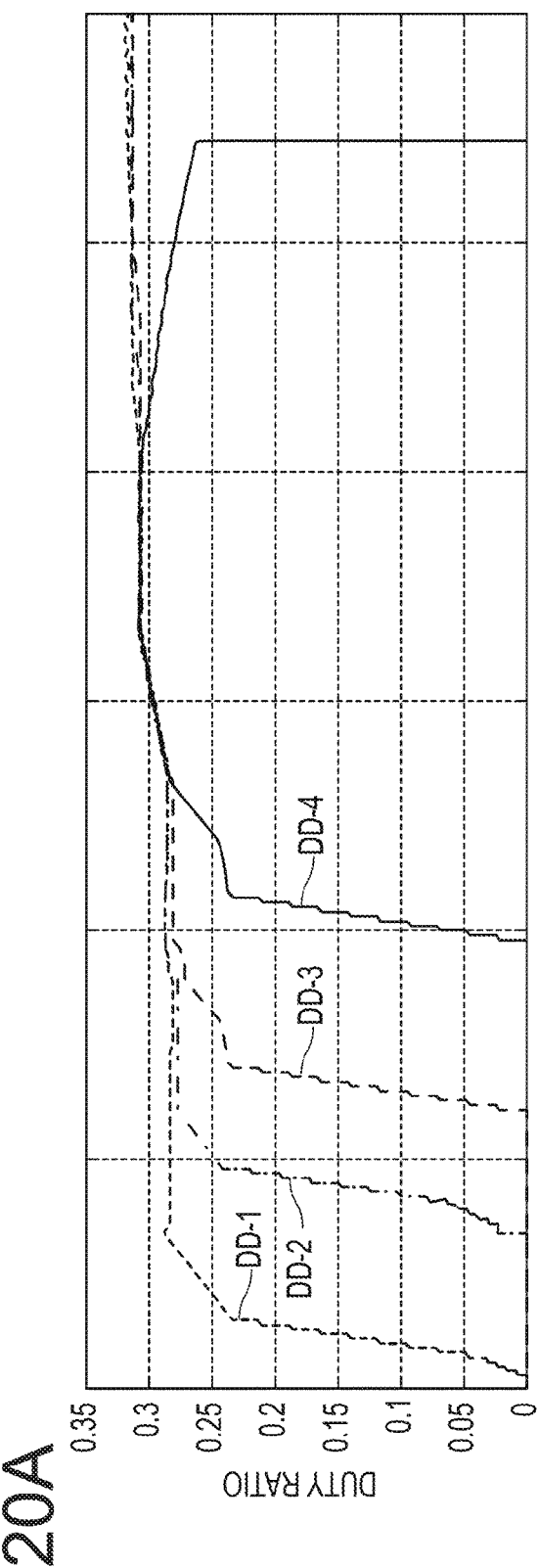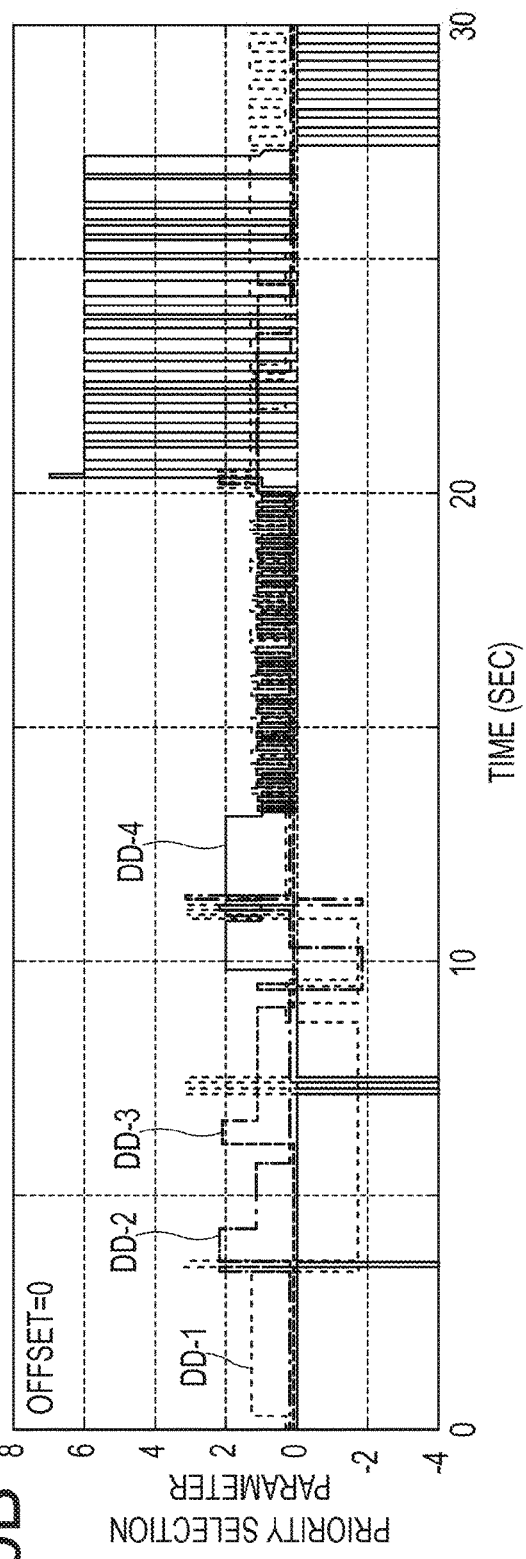

ELECTROLYTIC SYSTEM, ELECTROLYTIC CONTROL CIRCUIT, AND CONTROL METHOD FOR ELECTROLYTIC SYSTEM

CROSS-REFERENCE TO RELATED APPLICATION

This application is based upon and claims the benefit of priority of the prior Japanese Patent Application No. 2017-213060, filed on Nov. 2, 2017, the entire contents of which are incorporated herein by reference.

FIELD

The embodiments discussed herein are related to an electrolytic system, an electrolytic control circuit, and a control method for an electrolytic system.

BACKGROUND

In the related art, there has been known a technology of electrolyzing water by an electric energy generated by solar cells in order to generate hydrogen (see, e.g., Japanese Laid-open Patent Publication Nos. 2007-031813 and 2001-335982).

Related technologies are disclosed in, for example, Japanese Laid-Open Patent Publication Nos. 2007-031813 and 2001-335982.

SUMMARY

According to an aspect of the embodiments, an electrolytic system includes, a power generator that outputs a first DC power, a plurality of converters each of the plurality of converters is configured to convert the first DC power into a second DC power according to a target duty ratio, and output voltage information and current information of the second DC power, a plurality of electrolyzers each of the plurality of electrolyzers is configured to receive the second DC power output from each of the plurality of converters and generate a gas, a control circuit that outputs control information by which the first DC power approaches a maximum power, based on a voltage value and a current value of the first DC power, and a selection circuit that outputs the target duty ratio, and a selection signal as to whether to select each of the plurality of electrolyzers and each of the plurality of converters, based on the control information and the voltage information and the current information.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIGS. 12A to 12D are views illustrating an example of a case where lists are individually prepared in a memory;

FIG. 13 is a view illustrating an example of a case where lists are prepared as a structure in a memory;

FIG. 18 is a table indicating an example of a calculation method of a priority selection parameter;

FIGS. 20A and 20B are timing charts indicating an example of a change of a duty ratio and a priority selection parameter.

DESCRIPTION OF EMBODIMENTS

Figure 1:
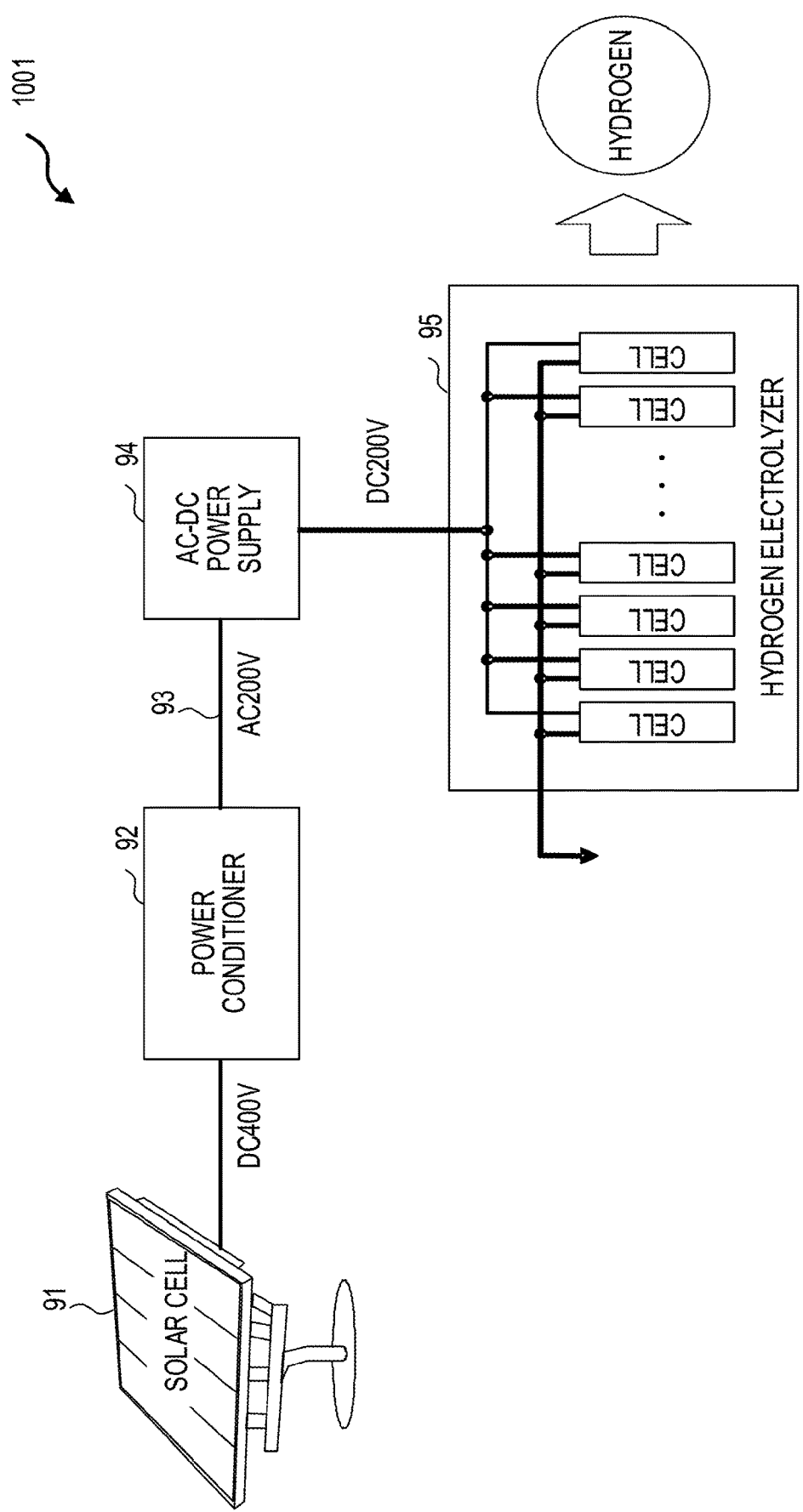
FIG. 1 is a view illustrating an example of a configuration of a hydrogen production system.

FIG. 1 is a view illustrating an example of a configuration of a hydrogen production system. A hydrogen production system 1001 illustrated in FIG. 1 includes a power conditioner 92 that converts a DC (Direct Current) voltage (e.g., DC 400 V) to an AC (Alternating Current) voltage (e.g., AC 200 V). When the power conditioner 92 is connected to a solar cell 91, a current flowing through an intermediate bus 93 becomes an AC. Therefore, in order to connect a hydrogen electrolyzer 95, it becomes necessary to reconvert AC into DC by an AC/DC converter 94, and thus a power conversion efficiency is reduced. In order to increase a voltage generated in the hydrogen electrolyzer 95, the number of cells connected in series (the number of stacks) may be increased. In this case, when an internal resistance increases by deterioration of at least one of cells connected in series, a deterioration acceleratively may progress in the cell due to a heat generation, and finally, there is a concern that the hydrogen electrolyzer 95 as a whole may not operate.

Hereinafter, an electrolytic system according to an exemplary embodiment of the present disclosure will be described.

<Electrolytic System>

Figure 2:
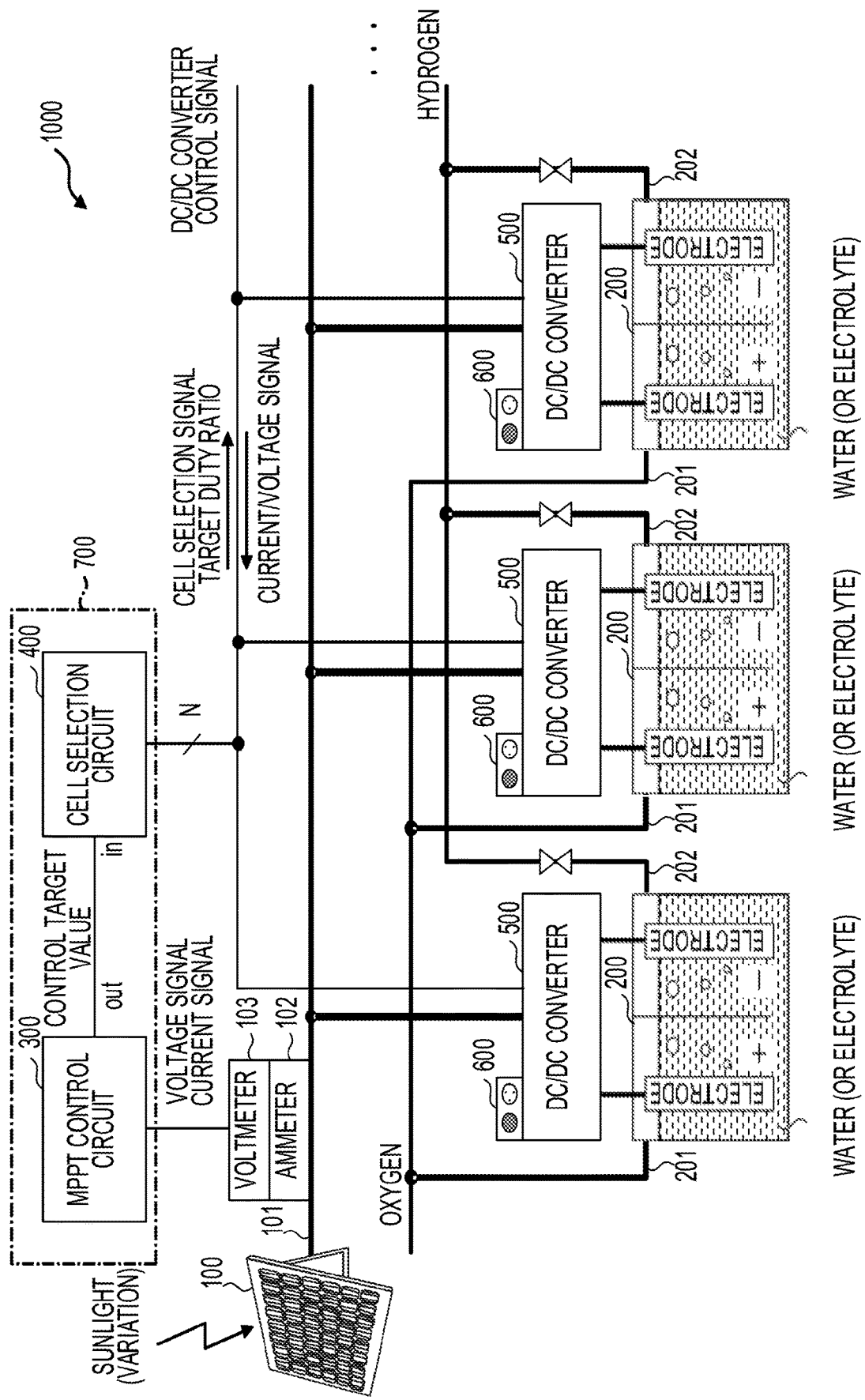
FIG. 2 is a view illustrating an example of a configuration of an electrolytic system according to the present disclosure.

FIG. 2 is a view illustrating an example of a configuration of an electrolytic system according to the present disclosure. An electrolytic system 1000 illustrated in FIG. 2 electrolyzes water by electric energy generated by a solar panel 100, thereby generating hydrogen. The electrolytic system 1000 controls the power extracted from the solar panel 100 such that a maximum power is output from the solar panel 100. The electrolytic system 1000 includes the solar panel 100, a plurality of DC/DC converters 500, a plurality of cells 200, and an electrolytic control circuit 700. The electrolytic control circuit 700 controls the plurality of DC/DC converters 500 and the plurality of cells 200. The electrolytic control circuit 700 includes a maximum power point tracking (MPPT) control circuit 300 and a cell selection circuit 400. The plurality of DC/DC converters 500 have the same configurations. The plurality of cells 200 also have the same configurations. Hereinafter, for example, each of the configuration and function will be described.

The solar panel 100 is an example of a power generator that outputs a generated first DC power, and has a plurality of solar cells arranged on a panel surface. A solar cell converts a light energy, such as sunlight, into a DC power by using a photovoltaic effect, and then outputs the DC power.

<Control of Solar Cells>

Figure 3:
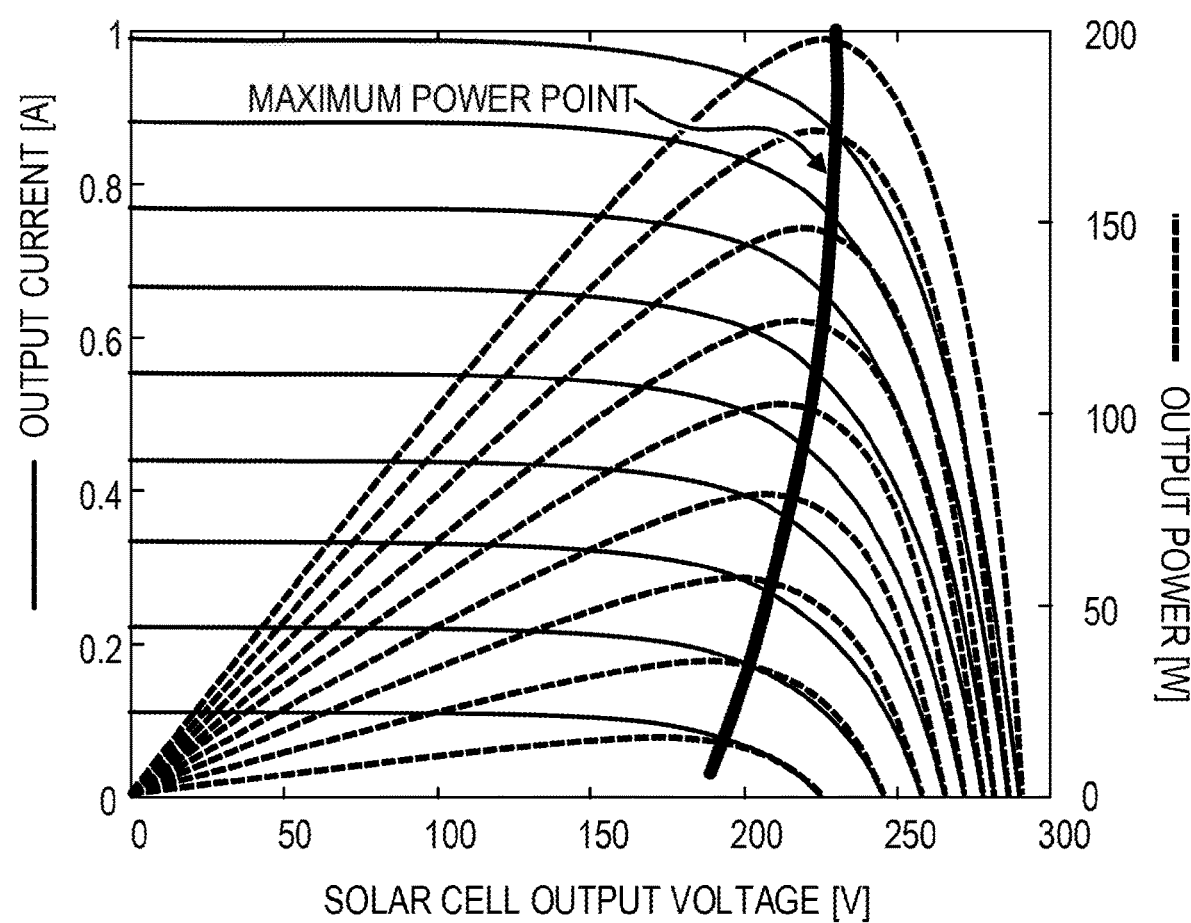
FIG. 3 is a view illustrating an example of a current-voltage characteristic (IV characteristic) of solar cells.

FIG. 3 is a view illustrating an example of a current-voltage characteristic (IV characteristic) of solar cells. The solar cells have a current-voltage characteristic like a battery with a relatively high internal resistance, and a voltage drop occurs when a current is extracted. A maximum power point determined by a current and a voltage at which a maximum power may be extracted varies according to an illuminance at which the solar cells are illuminated and a temperature of the solar cells. When the illuminance is high, a power generation amount increases, and thus the maximum power increases. Meanwhile, when the temperature of the solar cells increases, the internal resistance increases, and thus the maximum power decreases.

A method of controlling a power extracted from the solar cells so as to always satisfy the maximum power point is called a maximum power point tracking (MPPT) control, and a control method called a hill-climbing method is frequently used. In order to highly efficiently use the solar cells, the MPPT control is an effective technique. Hereinafter, an output power of the solar panel 100 at the maximum power point will be represented by a maximum power Psolar_max.

<MPPT Control Circuit by Hill-Climbing Method>

Figure 4:
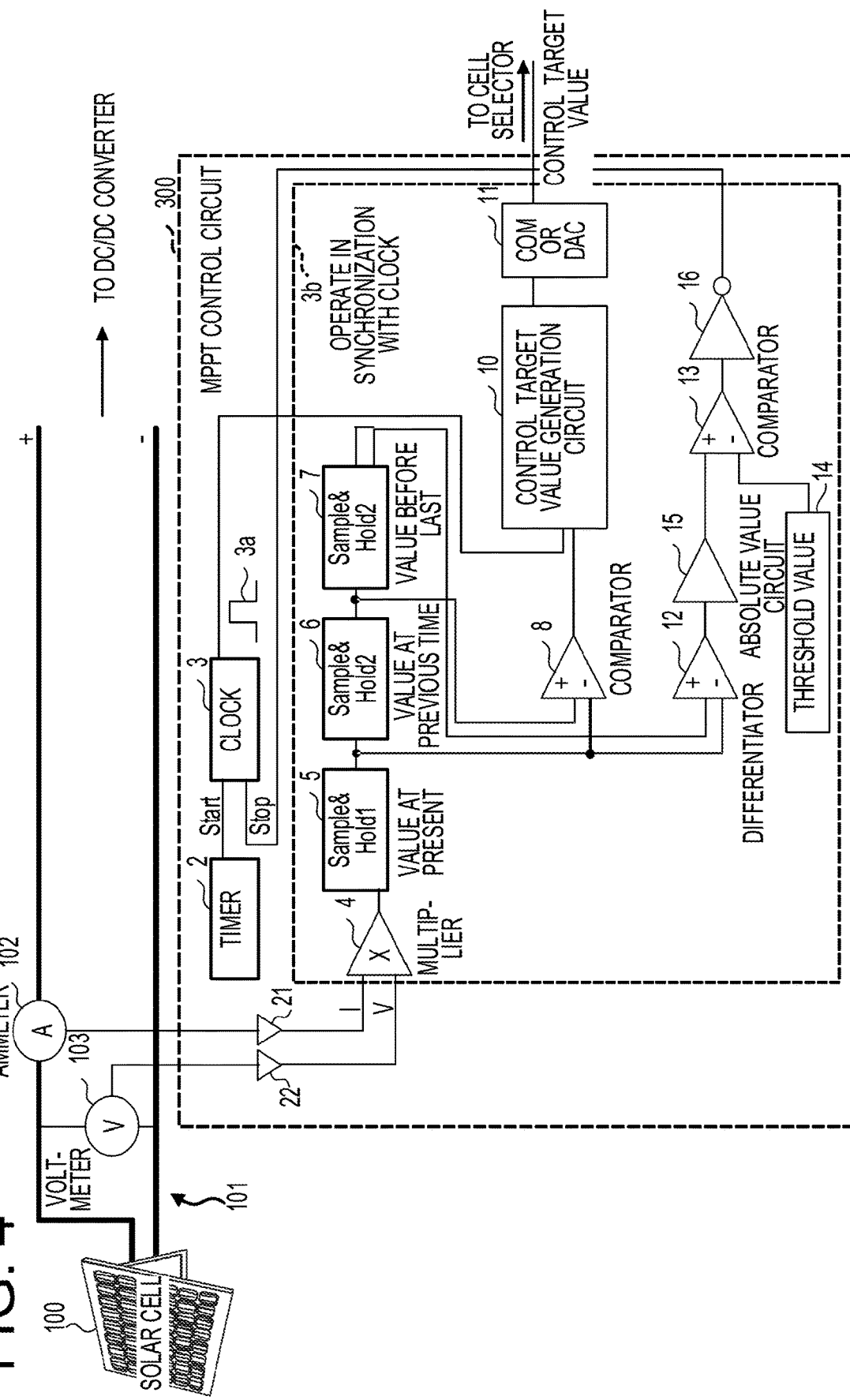
FIG. 4 is a view illustrating an example of a configuration of a maximum power point tracking (MPPT) control circuit by a hill-climbing method.

FIG. 4 is a view illustrating an example of a configuration of an MPPT control circuit by a hill-climbing method. The MPPT control circuit 300 controls a control target value such that the output power of the solar panel 100, which is calculated by an ammeter 102 and a voltmeter 103 provided in an output line 101 of the solar panel 100, becomes maximum. The control target value is an example of control information by which the output power of the solar panel 100 approaches the maximum power Psolar_max. In the present exemplary embodiment, the MPPT control circuit 300 controls a control target value of an electrolytic bath control circuit (specifically, the DC/DC converter 500) as one of loads of the solar panel 100.

Figure 5:
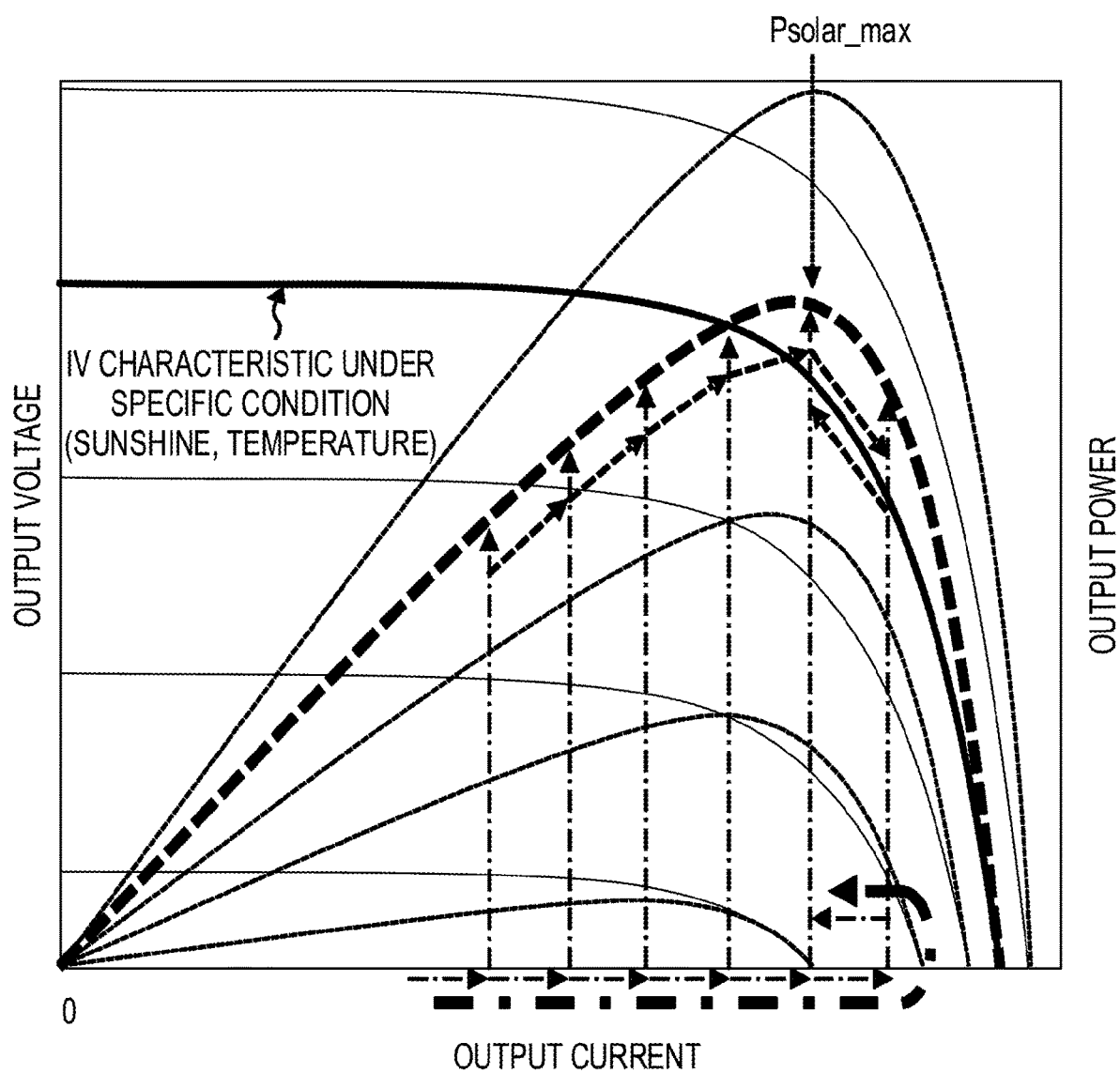
FIG. 5 is a view illustrating an example of an operation of a hill-climbing method when a control target value is used for an output current control.

FIG. 5 is a view illustrating an example of an operation of a hill-climbing method when a control target value is used for an output current control. Hereinafter, a configuration and a control operation of the MPPT control circuit 300 will be described in detail with reference to FIGS. 4 and 5.

The MPPT control circuit 300 includes a timer 2, a clock generator 3, and amplifiers 21 and 22. The MPPT control circuit 300 includes a multiplier 4, sample-and-hold circuits 5, 6, and 7, a comparator 8, a control target value generation circuit 10 (hereinafter, also referred to as "a generation circuit 10"), an interface circuit 11, a differentiator 12, an absolute value circuit 15, a comparator 13, and a stop signal generation circuit 16.

The ammeter 102 measures an output current of the solar panel 100 (a current flowing through the output line 101), and the voltmeter 103 measures an output voltage of the solar panel 100 (a voltage applied to the output line 101). A voltage signal indicating the measured voltage value V and a current signal indicating the measured current value I are input to the MPPT control circuit 300 through the amplifiers 21 and 22 for amplitude adjustment, as necessary. The voltage value V indicates a voltage value of a DC output power of the solar panel 100. The current value I indicates a current value of a DC output power of the solar panel 100.

The timer 2 indicates an interval timer that starts an operation of the MPPT control circuit 300. The timer 2 transmits a start signal (Start) of one pulse, to the clock generator 3, once in a predetermined time period (e.g., every 10 seconds). When receiving the start signal, the clock generator 3 generates and outputs a clock 3a of one pulse in a predetermined cycle (e.g., every 100 milliseconds), and activates a circuit that operates in synchronization with the clock 3a (a circuit 3b within a thin dotted line).

When the clock 3a is supplied to the circuit 3b, the voltage signal and the current signal are converted into a power signal indicating a power value, by the multiplier 4. The power value indicated by the power signal is stored in the sample-and-hold circuit 5. A sample-and-hold unit includes cascade-connected sample-and-hold circuits 5, 6, and 7 in three stages. The sample-and-hold circuits 5, 6, and 7 hold a power value Pnew corresponding to the clock 3a at present, a power value Pold corresponding to the clock 3a at the previous time, and a power value Poold corresponding to the clock 3a before last, respectively.

The comparator 8 compares magnitudes of the power value Pnew corresponding to the clock 3a at present, and the power value Pold corresponding to the clock 3a at the previous time, to each other, and outputs a comparison result to the generation circuit 10.

Here, a duty ratio of a switching operation performed by at least one DC/DC converter 500 in which a DC is converted into a DC will be represented by a duty ratio x.

When the power value Pnew at present is larger than the power value Pold at the previous time, it is estimated that a control target value which changes the duty ratio x has changed in a direction where the output power of the solar panel 100 is raised. Accordingly, when the comparator 8 detects that the power value Pnew at present is larger than the power value Pold at the previous time, the generation circuit 10 generates a control target value which changes the duty ratio x in the same direction as a previous-time changing direction. Accordingly, the output power of the solar panel 100 may be further raised and further approach the maximum power Psolar_max.

For example, in the case where the control target value has changed at the previous time in a direction where the duty ratio x is increased, when the comparator 8 detects that the power value Pnew at present is larger than the power value Pold at the previous time, the generation circuit 10 changes the control target value in a direction where the duty ratio x is also increased at present. Accordingly, for example, from a section where the output power of the solar panel 100 increases according to an increase of the output current of the solar panel 100, the output power of the solar panel 100 may be further raised so as to further approach the maximum power Psolar_max. In contrast, in the case where the control target value has changed at the previous time in a direction where the duty ratio x is decreased, when the comparator 8 detects that the power value Pnew at present is larger than the power value Pold at the previous time, the generation circuit 10 changes the control target value in a direction where the duty ratio x is also decreased at present. Accordingly, for example, from a section where the output power of the solar panel 100 decreases according to an increase of the output current of the solar panel 100, the output power of the solar panel 100 may be further raised so as to further approach the maximum power Psolar_max.

Meanwhile, when the power value Pnew at present is smaller than the power value Pold at the previous time, it is estimated that a control target value which changes the duty ratio x has changed in a direction where the output power of the solar panel 100 is lowered. Accordingly, when the comparator 8 detects that the power value Pnew at present is equal to or smaller than the power value Pold at the previous time, the generation circuit 10 generates a control target value which changes the duty ratio x in the opposite direction to a previous-time changing direction. Accordingly, the output power of the solar panel 100 may be raised and approach the maximum power Psolar_max.

For example, in the case where the control target value has changed at the previous time in a direction where the duty ratio x is increased, when the comparator 8 detects that the power value Pnew at present is equal to or smaller than the power value Pold at the previous time, the generation circuit 10 changes the control target value in a direction where the duty ratio x is decreased at present. Accordingly, for example, from a section where the output power of the solar panel 100 decreases according to an increase of the output current of the solar panel 100, the output power of the solar panel 100 may be raised so as to approach the maximum power Psolar_max. In contrast, in the case where the control target value has changed at the previous time in a direction where the duty ratio x is decreased, when the comparator 8 detects that the power value Pnew at present is equal to or smaller than the power value Pold at the previous time, the generation circuit 10 changes the control target value in a direction where the duty ratio x is increased at present. Accordingly, for example, from a section where the output power of the solar panel 100 increases according to an increase of the output current of the solar panel 100, the output power of the solar panel 100 may be raised so as to approach the maximum power Psolar_max.

The interface circuit 11 is a communication port that converts a control target value into a digital communication signal, for example, in the case of a digital communication, or is a digital analog converter that converts a control target value into an analog voltage in the case of transmission by an analog voltage signal. Hereinafter, the communication port may be referred to as a "COM" (COMmunication), and the digital analog converter may be referred to as a "DAC" (Digital-to-Analog converter).

The differentiator 12 outputs a difference between the power value Pnew corresponding to the clock 3a at present (the value from the sample-and-hold circuit 5) and the power value Poold corresponding to the clock 3a before last (the value from the sample-and-hold circuit 7). The absolute value circuit 15 obtains and outputs an absolute value of the difference. When the absolute value of the difference obtained by the absolute value circuit 15 becomes smaller than a predetermined threshold value 14, the comparator 13 determines that the output power of the solar panel 100 has reached the maximum power point, and causes the stop signal generation circuit 16 to generate a clock stop signal (Stop). When receiving the clock stop signal generated by the stop signal generation circuit 16, the clock generator 3 stops the output of the clock 3a regardless of whether the start signal is being received. Accordingly, the MPPT control of the MPPT control circuit 300 is stopped.

The generation circuit 10 continuously outputs a control target value immediately before the MPPT control circuit 300 is stopped, in a period during which the MPPT control of the MPPT control circuit 300 is stopped.

<Characteristic of Water Electrolysis Cell>

Figure 6:
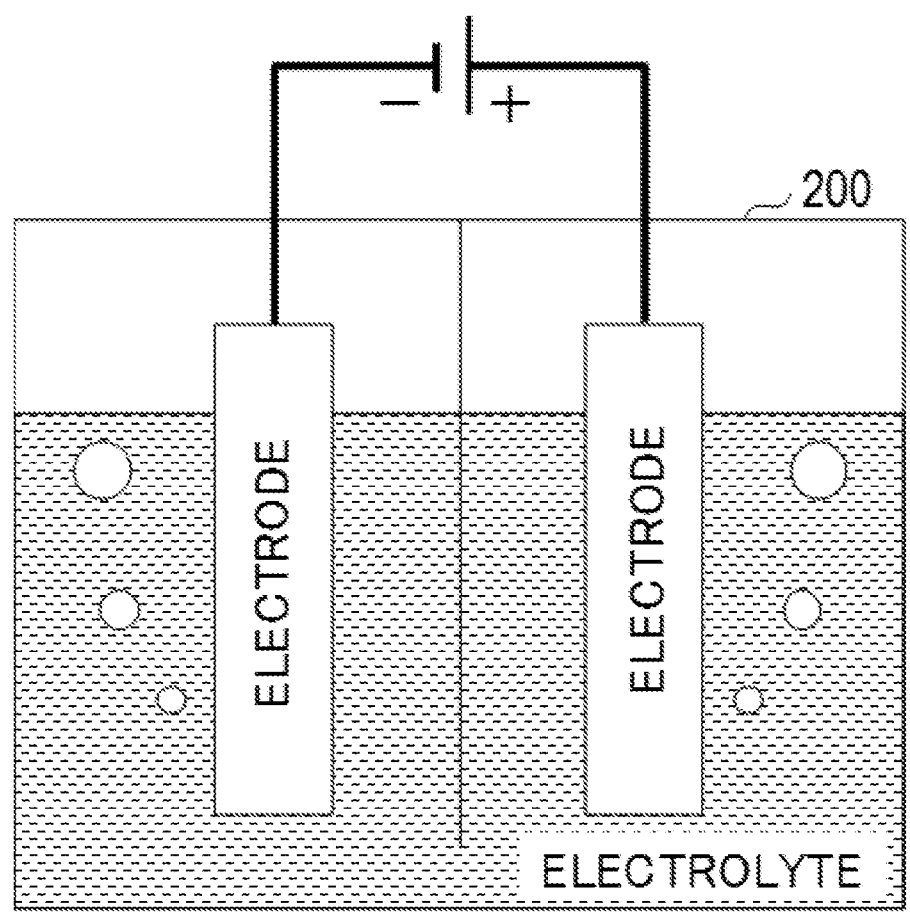
FIG. 6 is a schematic view illustrating an example of a water electrolysis cell.

FIG. 6 is a view illustrating an example of a configuration of a water electrolysis cell. The cell 200 is also referred to as a water electrolysis cell or an electrolytic bath. When a DC voltage is applied to water, electrolysis occurs, thereby generating a gas (specifically, oxygen and hydrogen). The generated oxygen is released to the atmosphere or is stored via an oxygen pipe 201 (see, e.g., FIG. 2). The generated hydrogen is stored via a hydrogen pipe 202 (see, e.g., FIG. 2). The stored hydrogen is used as energy.

The cell 200 is an example of an electrolyzer that generates a gas such as hydrogen when a direct current output from the corresponding DC/DC converter 500 is input. There are various types of water electrolysis cells such as an alkaline water-type, a high temperature steam-type, or a high molecular polymer-type.

Figure 7:
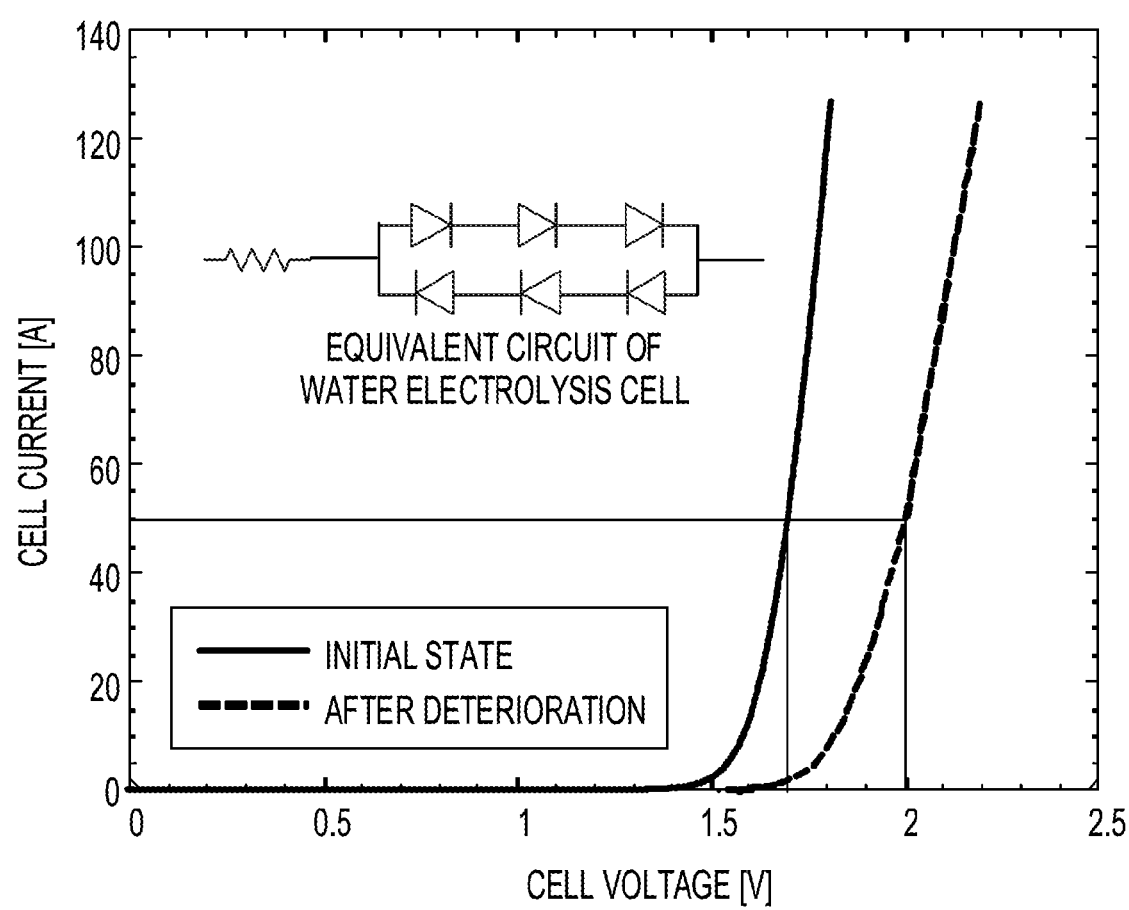
FIG. 7 is a view illustrating an example of an electric characteristic of a water electrolysis cell.

FIG. 7 is a view illustrating an example of an electric characteristic of a water electrolysis cell. The water electrolysis cell has a current-voltage characteristic like a diode, in which when a current rapidly flows out from a threshold voltage ranging from about 1 to 1.5 V, an electrolysis is started (see, e.g., the solid line in FIG. 7). When the use of the water electrolysis cell is continued, a resistance of the water electrolysis cell increases due to a deterioration of an electrode, and the current hardly flows (see, e.g., the dotted line in FIG. 7).

In the hydrogen production by solar power generation, since a variation of an input power input to the water electrolysis cell is large, it is desirable to use a room temperature operating-type electrolytic bath in which the lowering of the power efficiency is suppressible even at a low electric power. Since a change of a cell current of the water electrolysis cell is large with respect to a change of a cell voltage of the water electrolysis cell, it is desirable to perform a constant current control in which a current caused to flow through the water electrolysis cell is controlled to be constant, rather than a constant voltage control in which a voltage applied to the water electrolysis cell is controlled to be constant.

When a water electrolysis cell of several kW class or more is configured as a single cell, a cell current extremely increases (to several thousands A), and wiring becomes difficult. Thus, by stacking single cells in several tens to several hundreds of stages, it is possible to increase the entire operating voltage, and to decrease the cell current.

<DC/DC Converter>

Figure 8:
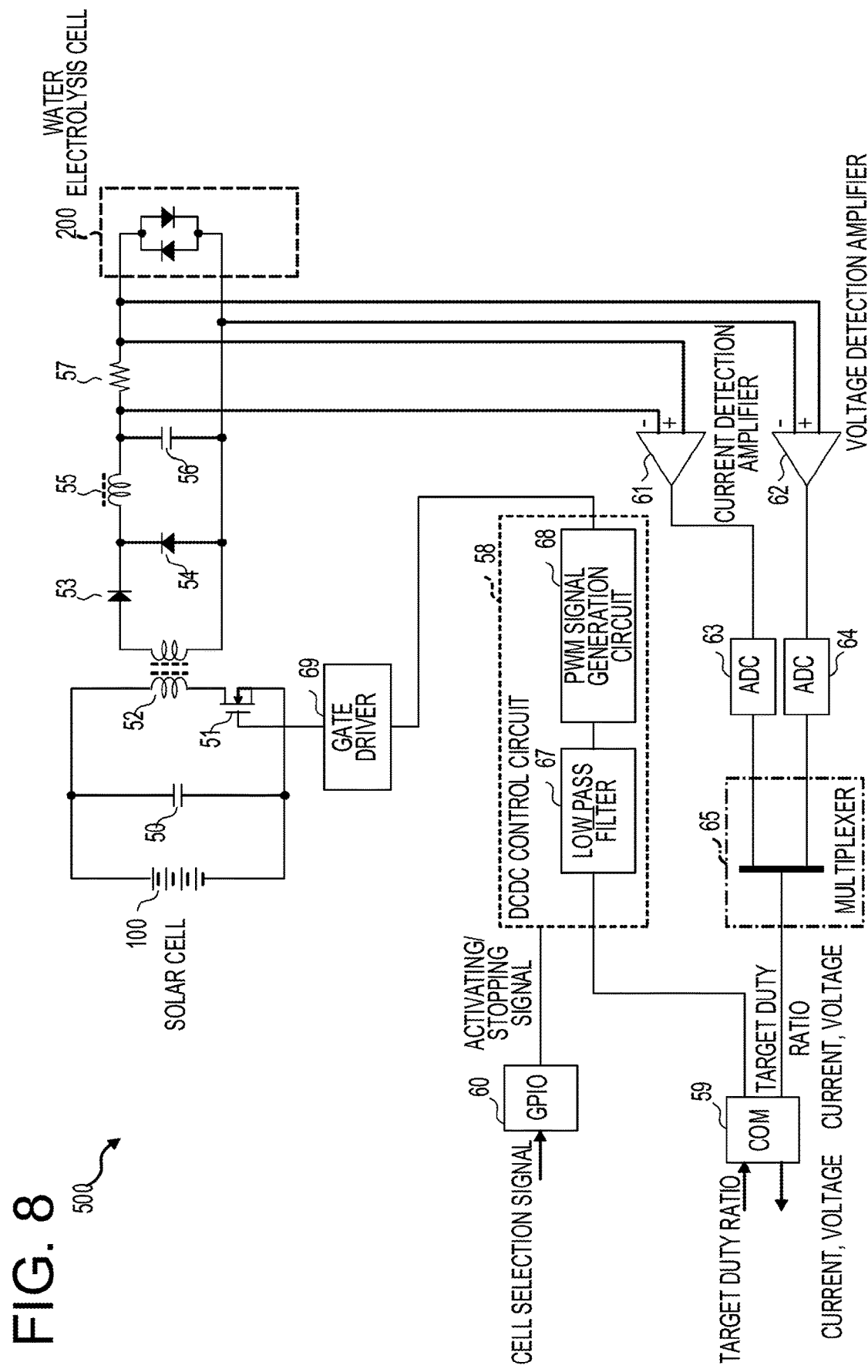
FIG. 8 is a view illustrating an example of a configuration of a DC/DC converter.

FIG. 8 is a view illustrating an example of a configuration of a DC/DC converter. FIG. 8 illustrates an example of a configuration of each of the plurality of DC/DC converters 500 illustrated in FIG. 2. The DC/DC converter 500 is an example of a converter, and is an example of a current control-type DC/DC converter that controls an output current supplied to the cell 200. Each of the plurality of DC/DC converters 500 converts a first DC power output by the solar panel 100, into a second DC power according to an input target duty ratio, and outputs voltage information of the second DC power and current information of the second DC power.

The DC/DC converter 500 illustrated in FIG. 8 includes a capacitor 50, a switch 51, a transformer 52, diodes 53 and 54, an inductor 55, a capacitor 56, a current detection resistor 57, a current detection circuit 61, and a voltage detection circuit 62. The DC/DC converter 500 includes analog-to-digital converters (ADC) 63 and 64, a DCDC control circuit 58, a gate driver 69, a multiplexer 65, a communication port (COM) 59, and a general purpose input/output port (GPIO) 60.

The DC/DC converter 500 transmits a power generated by the plurality of solar cells within the solar panel 100 via the transformer 52, through ON and OFF of the switch 51. The DC/DC converter 500 rectifies the power transmitted via the transformer 52 by the diodes 53 and 54, smoothens the power by the inductor 55 and the capacitor 56, and supplies the smoothened power to the cell 200.

The DCDC control circuit 58 performs a control of pulse width modulation (PWM) on the ON time of the switch 51, by the gate driver 69, such that a duty ratio in switching of the switch 51 matches a target duty ratio supplied via the communication port 59 from the cell selection circuit 400.

The DCDC control circuit 58 includes, for example, a low pass filter 67 and a PWM signal generation circuit 68. The PWM signal generation circuit 68 outputs a PWM signal that adjusts a duty ratio x of the DC/DC converter 500 to the target duty ratio filtered through the low pass filter 67. In the case of FIG. 8, the duty ratio x of the DC/DC converter 500 indicates the duty ratio in switching of the switch 51. The gate driver 69 switches the switch 51 according to the PWM signal output from the PWM signal generation circuit 68.

A current value of the output current supplied to the cell 200 is detected when, for example, a voltage generated at both ends of the current detection resistor 57 through which the output current flows is amplified by an amplifier of the current detection circuit 61. A voltage value of the output voltage applied to the cell 200 is detected through, for example, amplification by an amplifier of the voltage detection circuit 62.

The DC/DC converter 500 has a function of transmitting the voltage value of the output voltage applied to the cell 200 and the current value of the output current caused to flow through the cell 200 via the communication port 59, in order to manage the state of the cell 200. For example, the ADC 63 converts an analog current value detected by the amplifier of the current detection circuit 61 into a digital current detection value and outputs the digital current detection value, and the ADC 64 converts an analog voltage value detected by the amplifier of the voltage detection circuit 62 into a digital voltage detection value, and outputs the digital voltage detection value. The multiplexer 65 transmits the current detection value output from the ADC 63 and the voltage detection value output from the ADC 64 to the cell selection circuit 400 (see, e.g., FIG. 2) via the COM 59.

The DC/DC converter 500 has a function of switching between activation and stopping of the DC/DC converter 500, based on a cell selection signal received from the cell selection circuit 400 (see, e.g., FIG. 2) via the general purpose input/output port 60.

Figure 9:
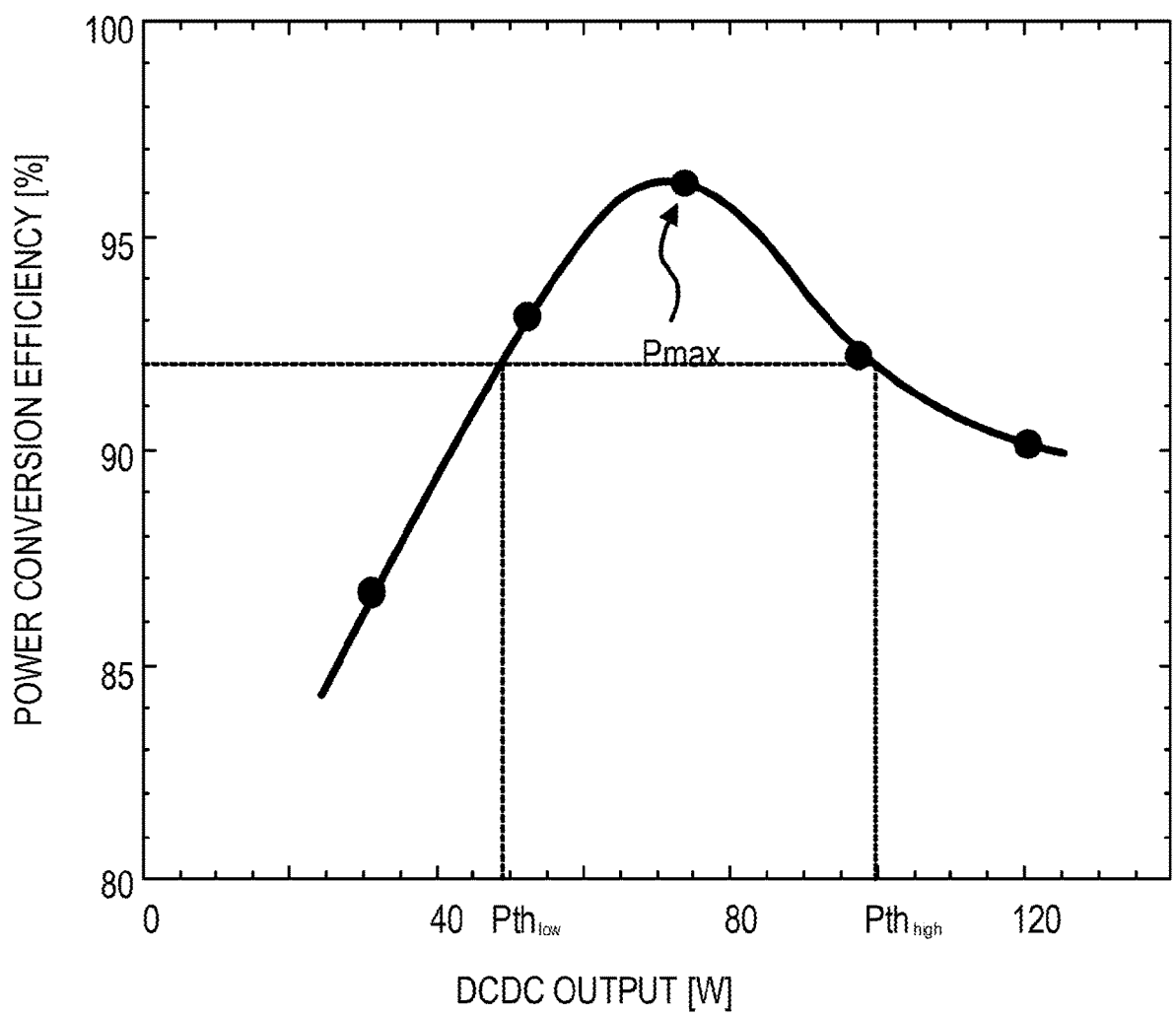
FIG. 9 is a view illustrating an example of the efficiency of a DC/DC converter.

FIG. 9 is a view illustrating an example of the efficiency of a DC/DC converter. On the high output side where the output power of the DC/DC converter is relatively high, the power conversion efficiency of the DC/DC converter is reduced due to an increase of a resistance loss. Meanwhile, on the low output side where the output power of the DC/DC converter is relatively low, the power conversion efficiency of the DC/DC converter is reduced due to a fixed loss of the control circuit and a switching loss according to ON/OFF of the switch.

Hereinafter, a power at which the power conversion efficiency of the DC/DC converter becomes maximum will be represented by a maximum efficiency power Pmax. The maximum efficiency power Pmax is a power between a minimum power Pthlow and a maximum power Pthhigh. The minimum power Pthlow indicates a minimum value of an output power range in which the DC/DC converter operates at a predetermined efficiency or higher, and the maximum power Pthhigh indicates a maximum value of an output power range in which the DC/DC converter operates at a predetermined efficiency or higher.

<Cell Selection Circuit>

Figure 10:
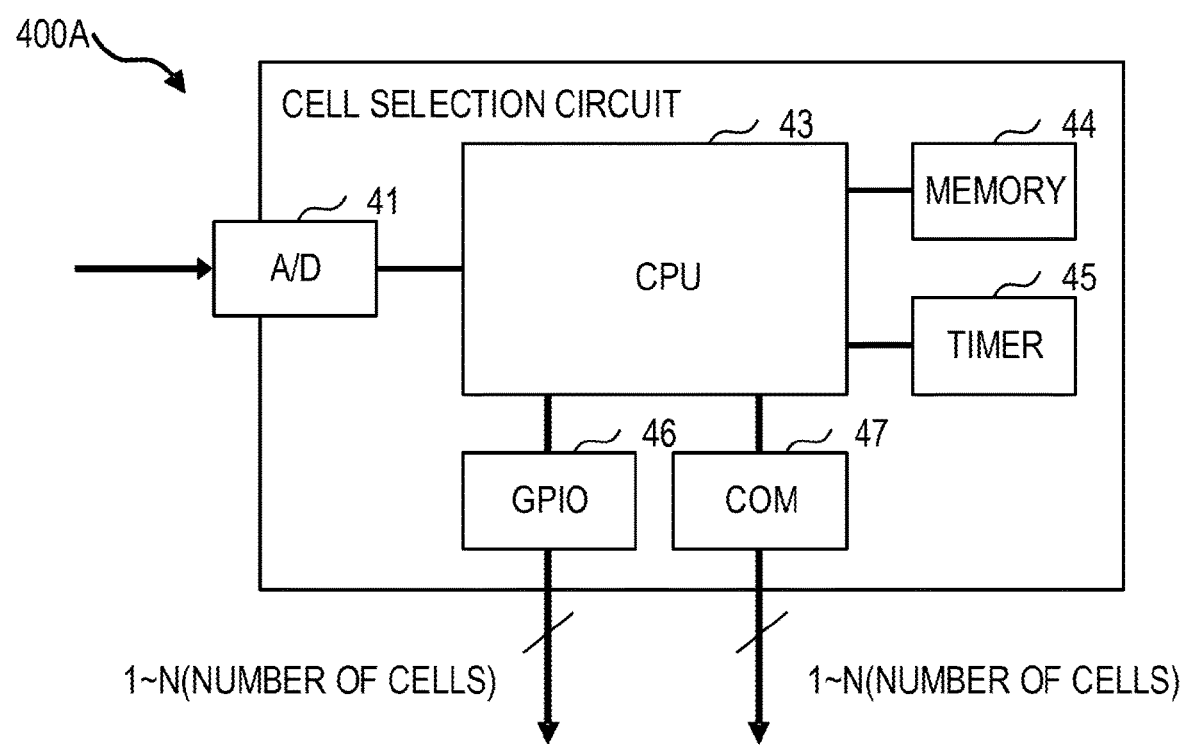
FIG. 10 is a view illustrating an example of a configuration of a cell selection circuit.

FIG. 10 is a view illustrating an example of a configuration of a cell selection circuit in the case where a control target value output from the MPPT control circuit 300 is an analog voltage. A cell selection circuit 400A illustrated in FIG. 10 is an example of the cell selection circuit 400 illustrated in FIG. 2. The cell selection circuit 400A includes an AD convertor (A/D) 41, a central processing unit (CPU) 43, a memory 44, a timer 45, a general purpose input/output port (GPIO) 46, and a communication port (COM) 47. To the A/D 41, a control target value output from the MPPT control circuit 300 (see, e.g., FIGS. 2 and 4) is input.

Figure 11:
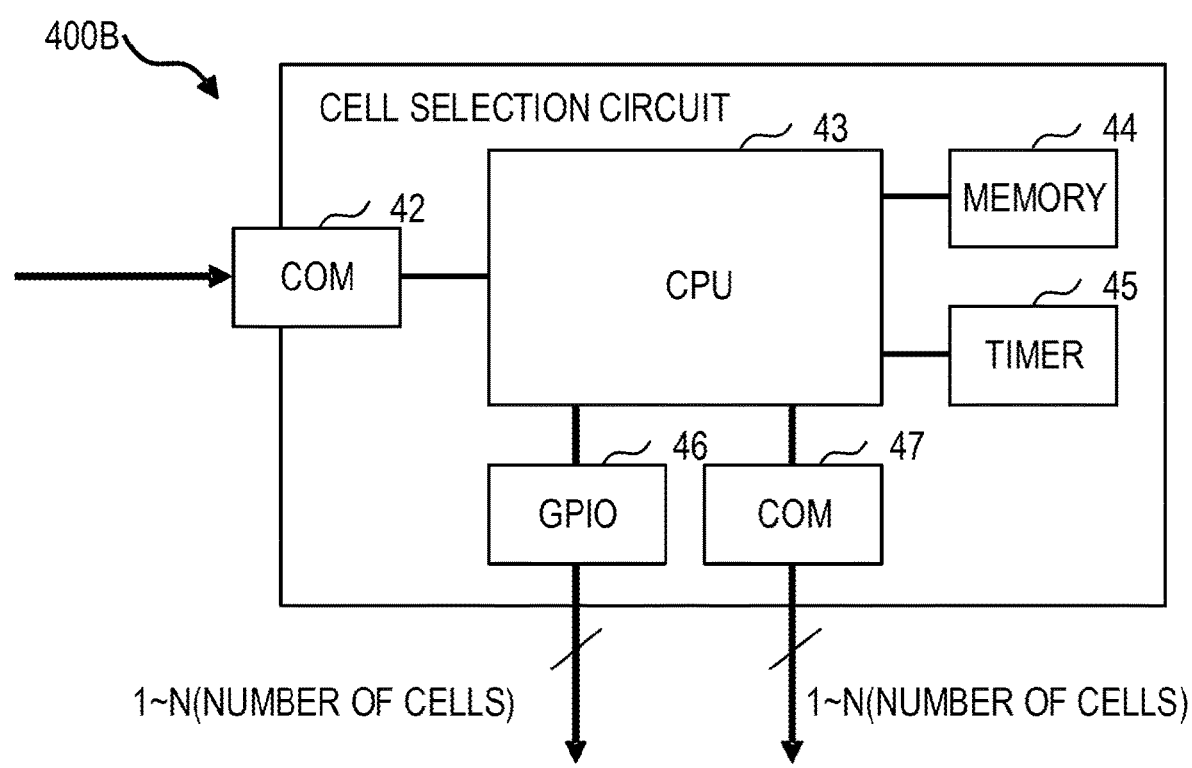
FIG. 11 is a view illustrating an example of a configuration of a cell selection circuit.

FIG. 11 is a view illustrating an example of a configuration of a cell selection circuit in the case where a control target value output from the MPPT control circuit 300 is digital. A cell selection circuit 400B illustrated in FIG. 11 is an example of the cell selection circuit 400 illustrated in FIG. 2. The cell selection circuit 400B includes a communication port (COM) 42, a CPU 43, a memory 44, a timer 45, a general purpose input/output port (GPIO) 46, and a communication port (COM) 47. To the COM 42, a control target value output from the MPPT control circuit 300 (see, e.g., FIGS. 2 and 4) is input.

Each function of the cell selection circuit 400 is implemented when the CPU 43 operates according to a program stored in the memory 44.

FIGS. 12A to 12D are views illustrating an example of a case where lists are individually prepared within a memory. In the memory 44 within the cell selection circuit 400, for example, as in FIGS. 12A to 12D, an operating time list, a cell resistance list, a use priority list, and a priority selection parameter list are stored. In the operating time list, an operating time of each of the plurality (N) of DC/DC converters 500 (i.e., an operating time (energization time) of each of the plurality of cells 200) is stored. In the cell resistance list, a cell resistance value of each of the plurality of (N) cells 200 is stored. In the use priority list, a use priority of each of the plurality of DC/DC converters 500 (i.e., a use priority of each of the plurality of cells 200) is stored. The DC/DC converter 500 (or the cell 200) having a higher use priority is preferentially used. In the priority selection parameter list, a priority selection parameter of each of the plurality of DC/DC converters 500 is stored. The DC/DC converter 500 having a higher priority selection parameter is preferentially selected as a target for which a duty ratio x is to be changed.

FIG. 13 is a view illustrating an example of a case where lists are prepared as a structure within a memory. In the memory 44 within the cell selection circuit 400, for example, as in FIG. 13, an operating time, a cell resistance value, a use priority, a priority selection parameter, a usability, a cell temperature, a cell voltage, a cell current, etc. are stored for each of the plurality of DC/DC converters 500 (i.e., the plurality of cells 200). In the field of the usability, T represents "usable," and F represents "unusable."

The cell selection circuit 400 illustrated in FIG. 2 is an example of a selection circuit. The cell selection circuit 400 outputs a target duty ratio and a cell selection signal, for each of the plurality of DC/DC converters 500, based on a control target value output by the MPPT control circuit 300, and voltage information and current information output by each of the plurality of DC/DC converters 500. The cell selection signal is an example of a selection signal as to whether to select the use of each of the plurality of cells 200 (or the plurality of DC/DC converters 500).

Here, the MPPT control is performed not by specifying a target current value of the output current of each of the DC/DC converters 500 by the cell selection circuit 400, but by specifying a target duty ratio of each of the DC/DC converters 500 by the cell selection circuit 400.

Figure 14:
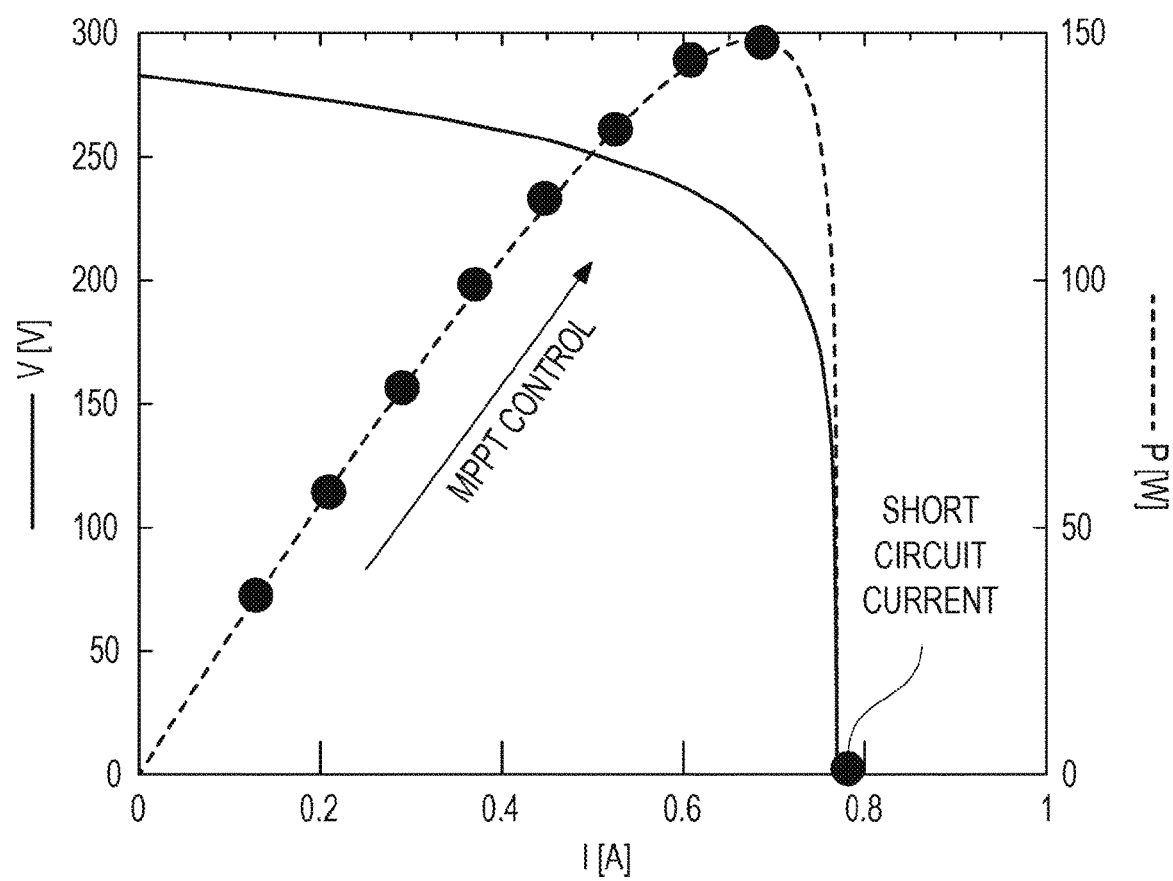
FIG. 14 is a view illustrating an example of a case where an MPPT control is performed by specifying a target current value of an output current of a DC/DC converter by a selection circuit.

FIG. 14 is a view illustrating an example of the case where the MPPT control is performed by specifying a target current value of the output current of the DC/DC converter by the cell selection circuit 400. In this case, the DCDC control circuit 58 (see, e.g., FIG. 8) controls the switching of the switch 51 such that a current value of the output current supplied to the cell 200 matches the target current value supplied from the cell selection circuit 400 via the communication port 59.

However, as illustrated in FIG. 14, after the output current I of the solar panel 100 gradually increases and the output power P of the solar panel 100 reaches the maximum power Psolar_max, the output power P rapidly decreases as the output current I increases. When the output current I is increased and the output voltage V of the solar panel 100 becomes zero, the output current I is called a short circuit current. Therefore, for example, when the target current value by which the output current I may be larger than the short circuit current is specified by the cell selection circuit 400, the output current I input to the DC/DC converter becomes rapidly insufficient, and thus the output current supplied to the cell 200 by the DC/DC converter is also insufficient. The DCDC control circuit 58 tries to increase the output current supplied to the cell 200 by increasing the duty ratio x, but the output current I input to the DC/DC converter is insufficient. Thus, even when the duty ratio x rises to around 100%, the output power P becomes substantially zero. As a result, until the target current value by which the output current I may be smaller than the short circuit current is supplied from the cell selection circuit 400, a state where the output power P is substantially zero is continued.

Figure 15A:
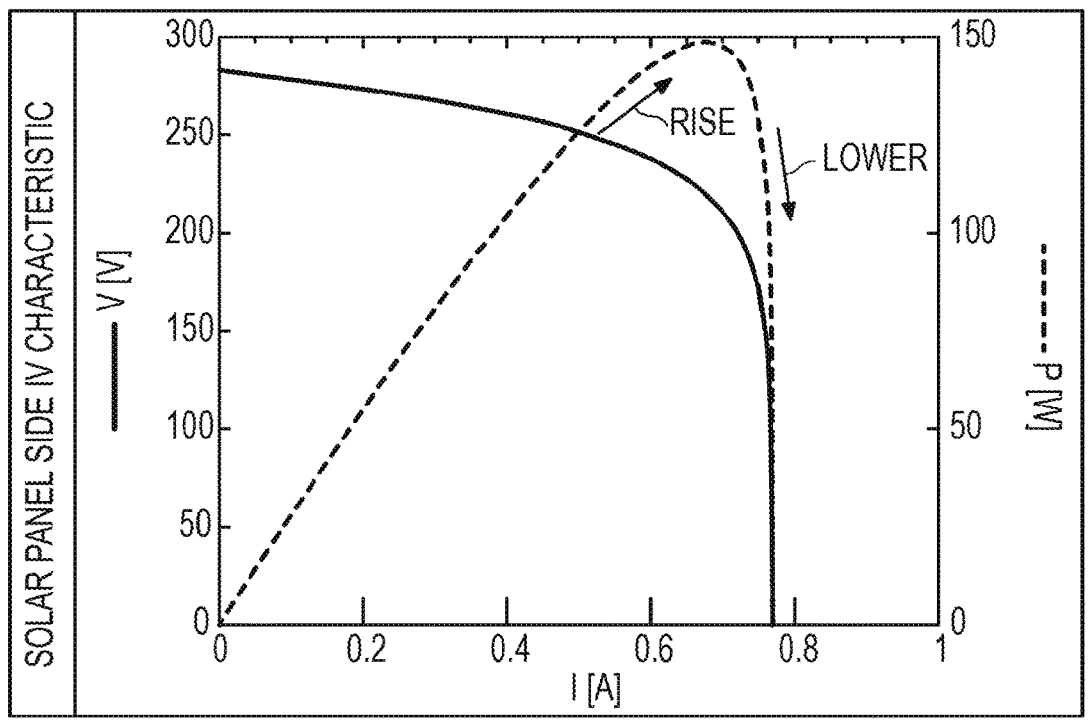
FIGS. 15A and 15B are views illustrating an example of a case where an MPPT control is performed by specifying a target duty ratio of a DC/DC converter by a selection circuit.
Figure 15B:
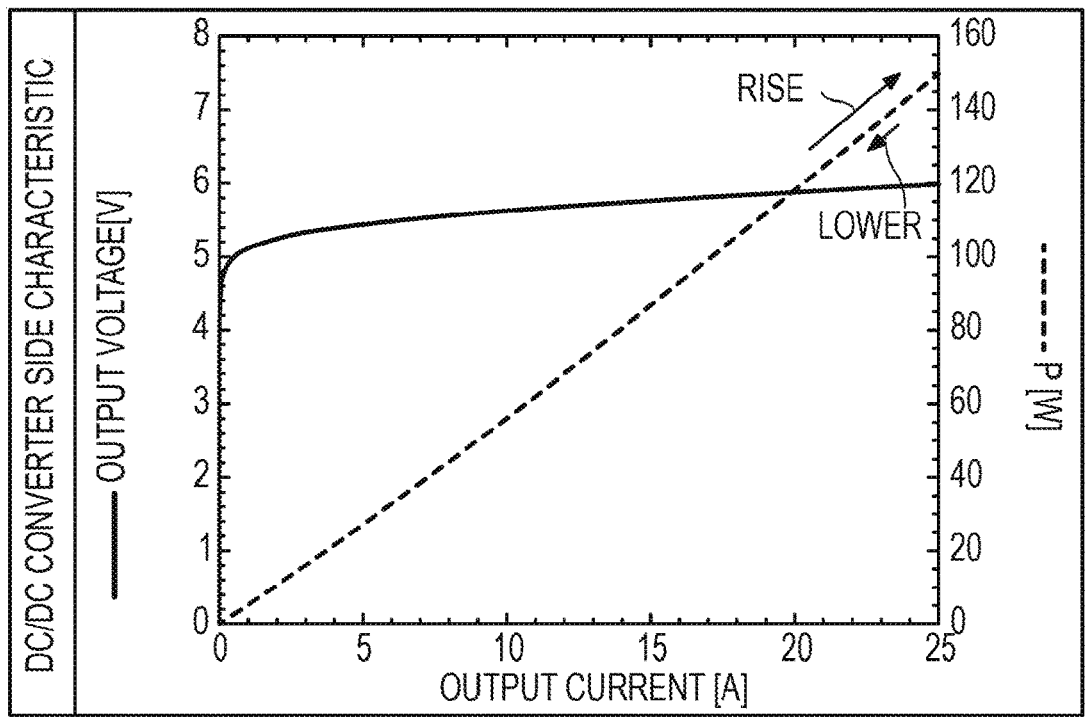

In contrast, FIGS. 15A and 15B are views illustrating an example of a case where the MPPT control is performed by specifying a target duty ratio of the DC/DC converter by the cell selection circuit 400. In this case, the DCDC control circuit 58 (see, e.g., FIG. 8) controls the switching of the switch 51 such that a duty ratio x in the switching of the switch 51 matches the target duty ratio supplied from the cell selection circuit 400 via the communication port 59.

Specifying the target duty ratio is equivalent to specifying a ratio between an input voltage Vin of the DC/DC converter and an output voltage Vout of the DC/DC converter. That is, when the duty ratio of the DC/DC converter is determined, an input/output voltage ratio of the DC/DC converter is also determined. For example, in the case of a step-down switching circuit of the DC/DC converter illustrated in FIG. 8, assuming that the output voltage V of the solar panel 100 is the input voltage Vin, and an input/output winding ratio of the transformer 52 is α:1, the duty ratio x is substantially the same as "α×(Vout/Vin)."

Accordingly, when a target duty ratio by which the output current I of the solar panel 100 becomes extremely large is supplied from the cell selection circuit 400, the output current I extremely flows. Then, the output voltage V of the solar panel 100 lowers, but the input voltage Vin of the DC/DC converter also lowers. However, since the input/output voltage ratio of the DC/DC converter is fixed to a value according to the target duty ratio, the lowering of the output voltage of the DC/DC converter is limited, and the lowering of the output current of the DC/DC converter is also limited. Due to application of such a negative feedback, even in a characteristic that after reaching the maximum power Psolar_max, the output power P of the solar panel 100 rapidly decreases as the output current I increases, the output power P hardly lowers to zero.

Figure 16A:
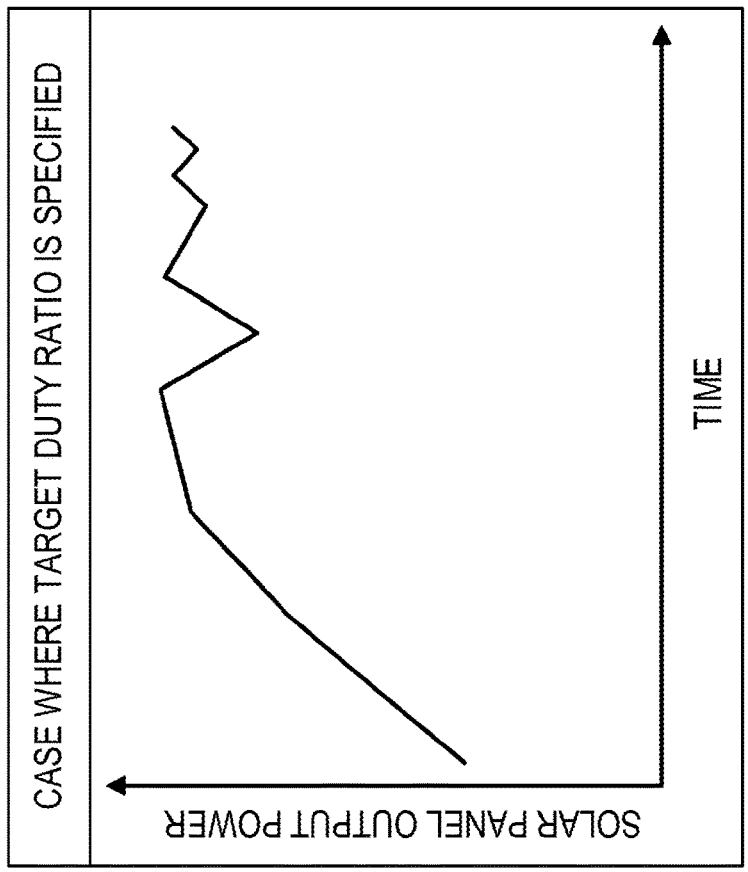
FIGS. 16A and 16B are views illustrating a comparison between a case where a target current value is specified and a case where a target duty ratio is specified.
Figure 16B:
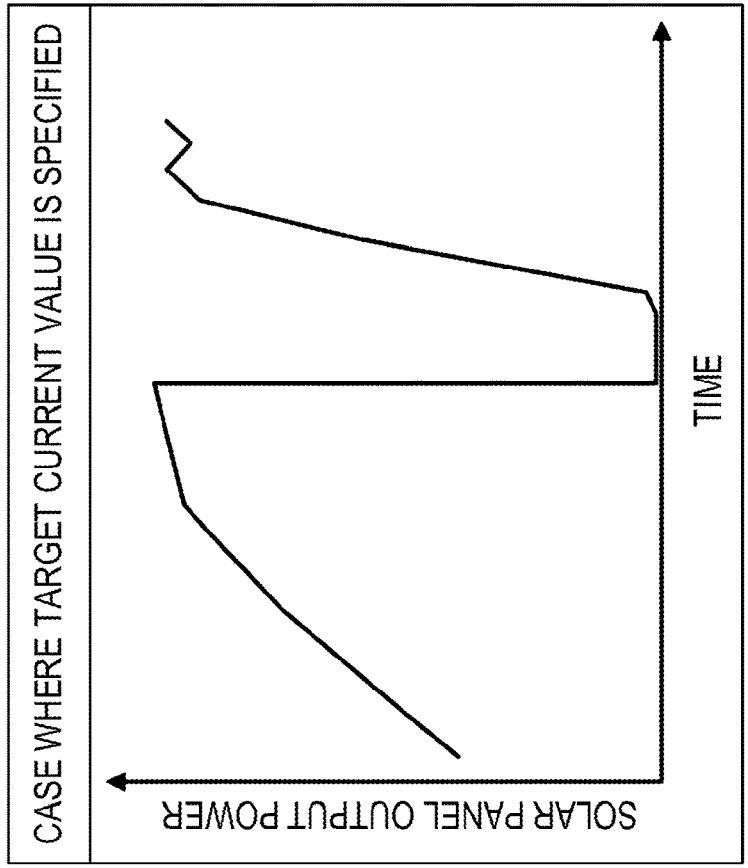

In this manner, when the DC/DC converter is controlled according to the target duty ratio, a control is stabilized as compared to a case where the DC/DC converter is controlled according to the target current value. For example, as illustrated in FIGS. 16A and 16B, when the DC/DC converter is controlled according to the target duty ratio, a variation of the output power P is small and a time until the maximum power point is reached may be shortened as compared to a case where the DC/DC converter is controlled according to the target current value.

Figure 17:
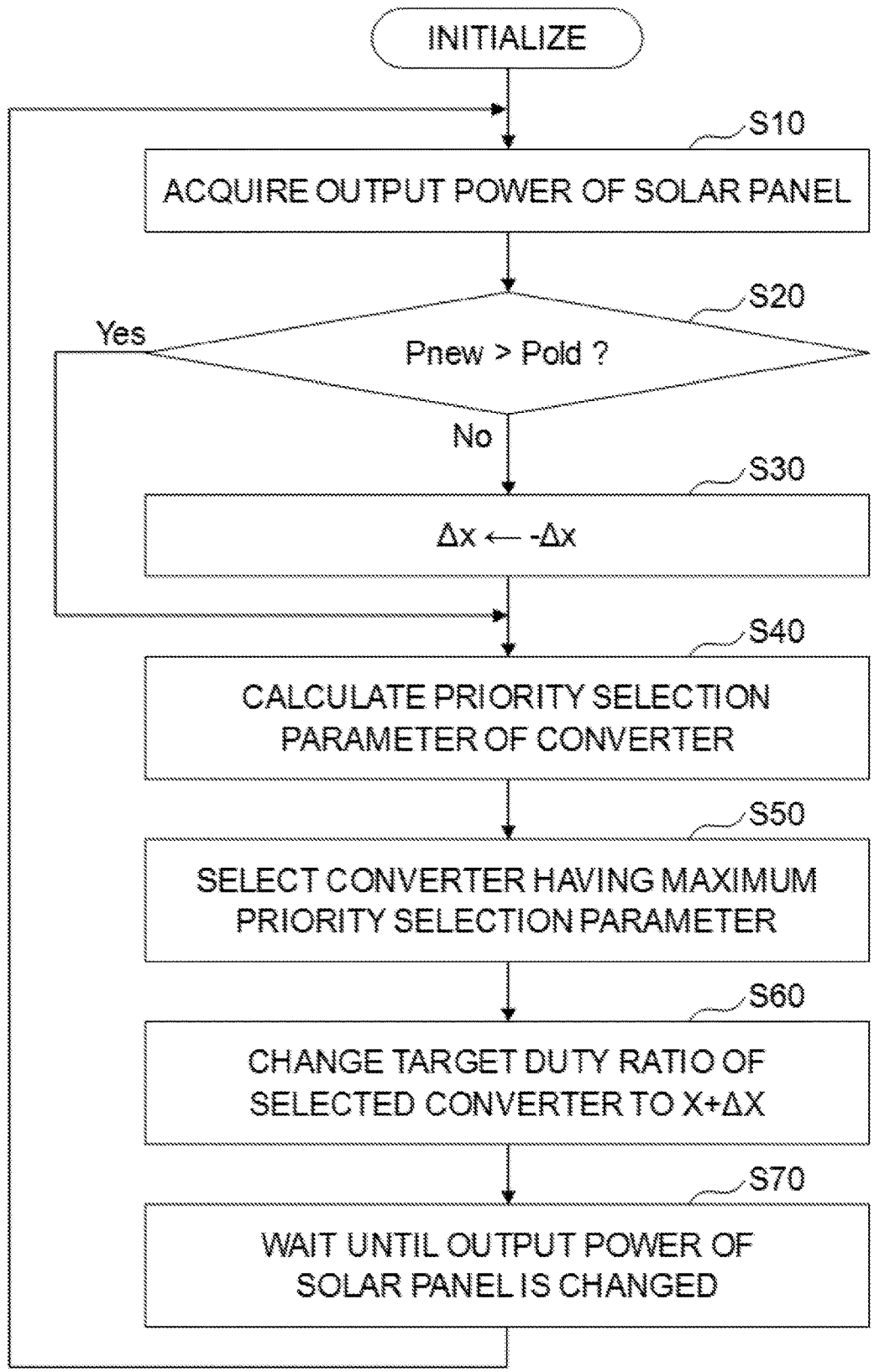
FIG. 17 is a flow chart illustrating an example of a case where an MPPT control is performed by specifying a target duty ratio of a DC/DC converter.

FIG. 17 is a flow chart illustrating an example of a case where the MPPT control is performed by specifying a target duty ratio of a DC/DC converter. Hereinafter, FIG. 17 will be described with reference to the configurations illustrated in FIGS. 2 and 4.

The flow of a series of processings as illustrated in FIG. 17 is repeated, for example, at each cycle of the clock 3a after initialization.

In step S10, the MPPT control circuit 300 acquires an output power of the solar panel 100 by the multiplier 4. In step S20, the MPPT control circuit 300 compares magnitudes of a power value Pnew corresponding to the clock 3a at present and a power value Pold corresponding to the clock 3a at the previous time to each other, by the comparator 8.

The generation circuit 10 generates a control target value which changes a duty ratio x of at least one DC/DC converter among the plurality of DC/DC converters 500. The generation circuit 10 generates, for example, the control target value corresponding to a value of a change amount Δx of the duty ratio x.

When the comparator 8 detects that the power value Pnew at this time is larger than the power value Pold at the previous time, the generation circuit 10 outputs (specifies) the control target value corresponding to the value of the change amount Δx having the same sign as a change amount Δx at the previous time, to the cell selection circuit 400. The sign of the change amount Δx is a symbol indicating whether the value of the change amount Δx is positive or negative. Meanwhile, when the comparator 8 detects that the power value Pnew at present is equal to or smaller than the power value Pold at the previous time, the generation circuit 10 outputs (specifies) the control target value corresponding to the value of the change amount Δx having a sign inverted with respect to a change amount Δx at the previous time, to the cell selection circuit 400 (step S30).

The cell selection circuit 400 selects a DC/DC converter for which a duty ratio x is to be changed by a specified change amount Δx, among the plurality of DC/DC converters 500. Thus, the cell selection circuit 400 calculates a priority selection parameter of each of the plurality of DC/DC converters 500 whenever the control target value corresponding to the value of the change amount Δx is specified (step S40). The cell selection circuit 400 records a calculation result of each priority selection parameter, in a cell attribute list within the memory 44 (see, e.g., FIGS. 12A to 12D and 13) in a readable manner. The cell selection circuit 400 calculates the priority selection parameter based on, for example, a relation rule illustrated in FIG. 18.

FIG. 18 is a table indicating an example of a calculation method of the priority selection parameter. Pout indicates an output power of a DC/DC converter. A minimum power Pthlow indicates a minimum value of an output power range in which the DC/DC converter operates at a predetermined efficiency or higher, and a maximum power Pthhigh indicates a maximum value of an output power range in which the DC/DC converter operates at a predetermined efficiency or higher (see, e.g., FIG. 9). The Pthlow and the Pthhigh are stored in the memory 44 in advance.

The cell selection circuit 400 calculates the output power Pout of each of the DC/DC converters 500 by the CPU 43, based on a current detection value and a voltage detection value transmitted from each of the DC/DC converters 500. The cell selection circuit 400 calculates the priority selection parameter by using the relation rule illustrated in FIG. 18, based on the calculation result of the output power Pout of each of the DC/DC converters 500.

In FIG. 18, a positive value of a change amount Δx (Δx>0) indicates that a duty ratio x is to be increased by the cell selection circuit 400 (i.e., an output current of the solar panel 100 is increased so that an output power of the solar panel 100 approaches a maximum power Psolar_max). Meanwhile, a negative value of a change amount Δx (Δx<0) indicates that a duty ratio x is to be decreased by the cell selection circuit 400 (i.e., an output current of the solar panel 100 is decreased so that an output power of the solar panel 100 approaches a maximum power Psolar_max).

When Δx>0, the cell selection circuit 400 increases a priority selection parameter for a converter in which Pout is smaller than Pthlow, among the plurality of DC/DC converters 500, by 1.0. This may increase the probability that a converter operating at an efficiency less than a desired efficiency is preferentially selected as a target for which a duty ratio x is to be changed. When Δx>0, the cell selection circuit 400 decreases a priority selection parameter for a converter in which Pout is larger than Pthhigh, among the plurality of DC/DC converters 500, by 2.0. When Δx>0, the cell selection circuit 400 further increases a priority selection parameter for a converter having the largest priority selection parameter, among the plurality of DC/DC converters 500, by 1.0. Accordingly, when this processing flow is repeated, for the converter having the largest priority selection parameter, Pout becomes larger than Pthhigh, and thus the priority selection parameter is decreased and the probability that the converter is preferentially selected is lowered.

Meanwhile, when Δx<0, the cell selection circuit 400 increases a priority selection parameter for a converter in which Pout is larger than Pthhigh, among the plurality of DC/DC converters 500, by 5.0. This may increase a probability that a converter operating at an efficiency less than a desired efficiency is preferentially selected as a target for which a duty ratio x is to be changed. When Δx<0, the cell selection circuit 400 increases a priority selection parameter for a converter in which Pout is smaller than Pthlow, among the plurality of DC/DC converters 500, by 2.0. This may increase a probability that a converter operating at an efficiency less than a desired efficiency is preferentially selected as a target for which a duty ratio x is to be changed. When Δx<0, the cell selection circuit 400 increases a priority selection parameter for a converter having the smallest priority selection parameter among the plurality of DC/DC converters 500, by 1.0. This may increase a probability that a converter having the smallest priority selection parameter is preferentially selected as a target for which a duty ratio x is to be changed.

In step S50, the cell selection circuit 400 selects a converter having the largest priority selection parameter, among the plurality of DC/DC converters 500. In step S60, the cell selection circuit 400 changes a target duty ratio of the converter selected in step S50 to (x+Δx) by using the change amount Δx specified by the generation circuit 10 of the MPPT control circuit 300. That is, the cell selection circuit 400 outputs a cell selection signal indicating that the converter selected in step S50 has been selected as a target for which a duty ratio is to be changed, and outputs the target duty ratio (x+Δx). Here, it is desirable that the cell selection circuit 400 outputs the cell selection signal such that a cell or a DC/DC converter having a higher use priority (see, e.g., FIGS. 12A to 12D and 13) is preferentially used.

In step S70, the process waits until a change of the output power of the solar panel 100 is detected. When a next cycle of the clock 3a is detected, processings from step S10 are performed again.

Figure 19A:
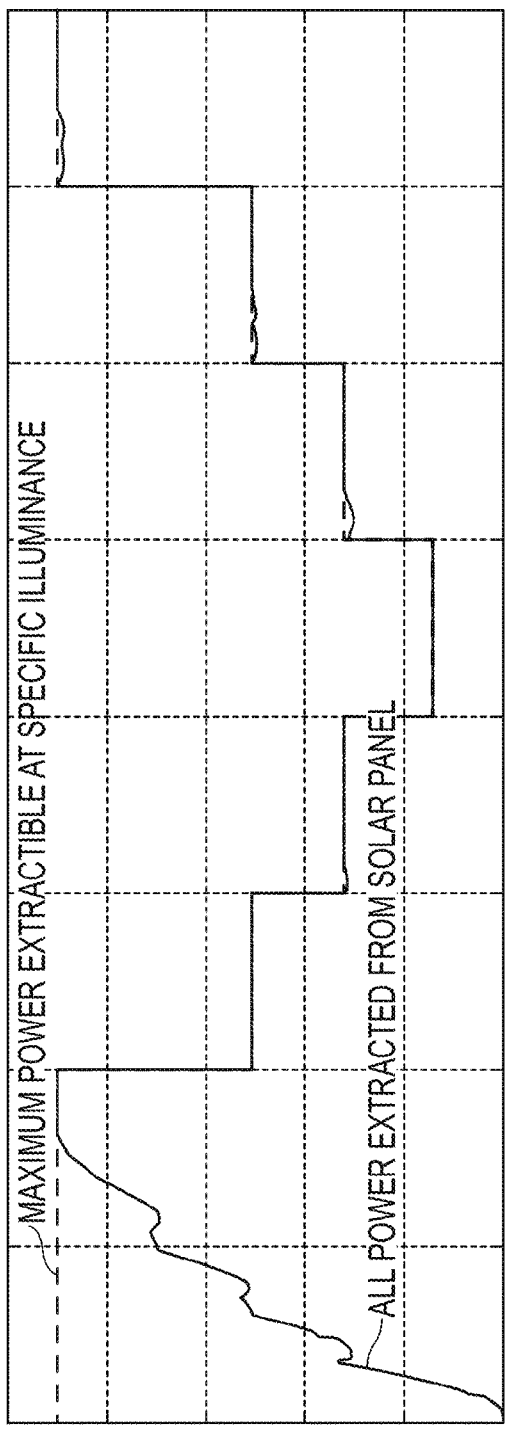
FIGS. 19A and 19B are timing charts indicating an example of a change of each output power in a solar panel and a DC/DC converter.
Figure 19B:
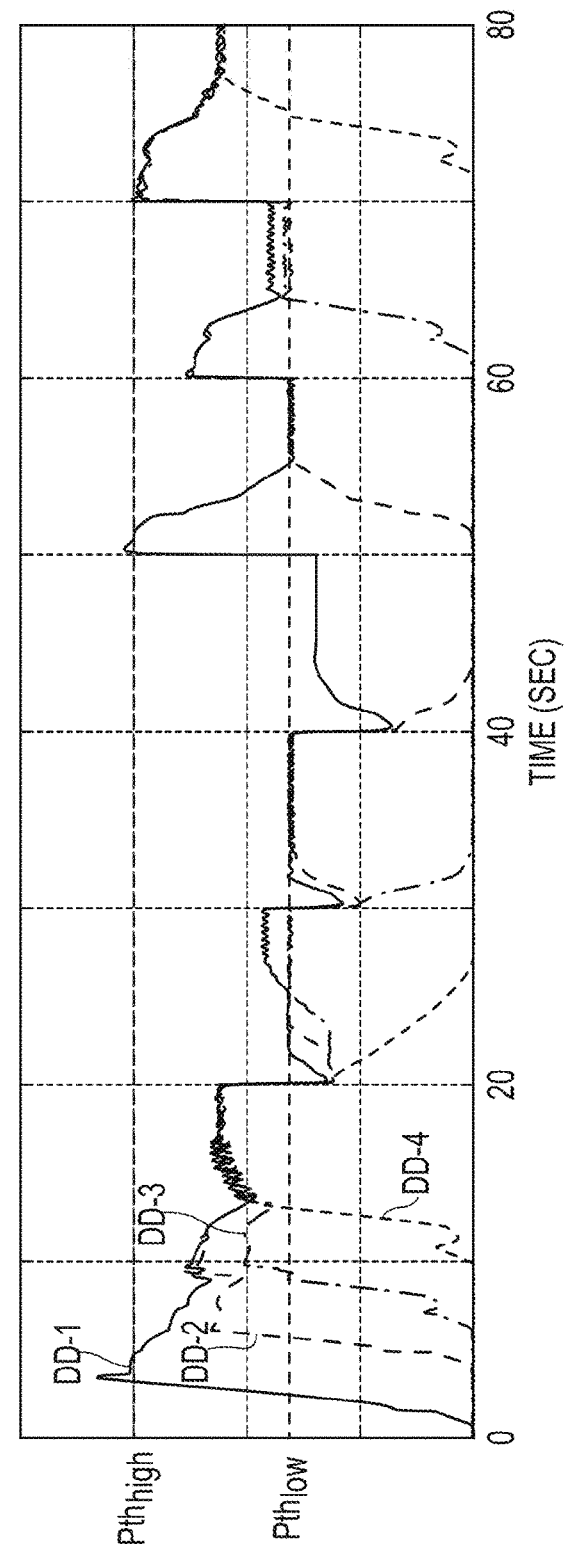

FIGS. 19A and 19B are timing charts indicating an example of a change of each output power in the solar panel 100 and four DC/DC converters 500 (DD-1, DD-2, DD-3, and DD-4). FIGS. 20A and 20B are timing charts indicating an example of a change of a duty ratio x and a priority selection parameter, for each of the four DC/DC converters 500 (DD-1, DD-2, DD-3, and DD-4). FIGS. 19A, 19B, 20A, and 20B illustrate an example when the processing flow illustrated in FIGS. 17 and 18 is executed. FIGS. 20A and 20B illustrate a time period from 0 sec to 30 sec in FIGS. 19A and 19B, in an enlarged scale. As illustrated in FIGS. 19A, 19B, 20A, and 20B, even when the output power of the solar panel 100 is varied, it is possible to operate each DC/DC converter in or around an output power range at a desired efficiency or higher. Thus, the power conversion efficiency of all the plurality of DC/DC converters is also improved.

Meanwhile, the cell selection circuit 400 may also have a function of equalizing respective operating times of the plurality of DC/DC converters 500 or the plurality of cells 200. The CPU 43 of the cell selection circuit 400 records a value (a count time) obtained by counting, by using the timer 45, an operating time of the DC/DC converter 500 that supplies a power to the normally operating cell 200 (a time during which each cell 200 is energized), in the memory 44. Accordingly, an operating time list is created within the memory 44. The CPU 43 of the cell selection circuit 400 determines that a cell having a shorter operating time is longer in the life expectancy (deterioration is not progressing), with reference to the created operating time list. The CPU 43 outputs a cell selection signal which selects the use of a cell having the shortest operating time so that the corresponding cell is preferentially operated. Accordingly, since the respective operating times of the plurality of cells 200 may be equalized, it is possible to suppress a deterioration of a part of the cells 200 from excessively progressing.

The CPU 43 of the cell selection circuit 400 calculates a cell resistance value of each of the plurality of cells 200, based on a current value and a voltage value collected from each of the plurality of DC/DC converters 500 via the COM 47, and records the cell resistance value in the memory 44. Accordingly, a cell resistance list is created within the memory 44. The CPU 43 of the cell selection circuit 400 determines that a cell having a smaller cell resistance value is longer in the life expectancy (deterioration is not progressing), with reference to the created cell resistance list. The CPU 43 outputs a cell selection signal which selects the use of a cell having the smallest cell resistance value so that the corresponding cell is preferentially operated. Accordingly, since the respective cell resistance values of the plurality of cells 200 may be equalized, it is possible to suppress a deterioration of a part of the cells 200 from excessively progressing.

The CPU 43 of the cell selection circuit 400 determines that the cell 200 having a cell resistance value exceeding a predetermined threshold value has deteriorated. In order to stop the use of the deteriorated cell 200, the cell selection circuit 400 outputs, for example, a cell selection signal which stops the operation of the DC/DC converter 500 that controls a current supplied to the deteriorated cell 200, via the GPIO 46 (see, e.g., FIGS. 10 and 11). The CPU 43 of the cell selection circuit 400 generates an alarm in an alarm device 600 (see, e.g., FIG. 2) corresponding to the cell 200 having a cell resistance value exceeding the threshold value, among the plurality of cells 200. As the alarm occurs by light, sound, etc., a user may be allowed to identify the deteriorated cell.

The cell selection circuit 400 outputs a cell selection signal indicating which one of the plurality of DC/DC converters 500 and the plurality of cells 200 is to be operated, according to the attribute of each of the plurality of cells 200 recorded in the memory 44. Specific examples of the attribute of the cell 200 may include a usage time of the cell 200, a cell resistance value of the cell 200, etc.

For example, the CPU 43 of the cell selection circuit 400 determines use priorities of the cells 200 with reference to the attribute of each of the plurality of cells 200. The CPU 43 of the cell selection circuit 400 outputs a cell selection signal to each of the DC/DC converters 500 such that the cells are used in order from the cell having the highest use priority. The CPU 43 of the cell selection circuit 400 starts the timer 45, and measures the operating time (usage time) of each of the cells 200 or the DC/DC converters 500.

In FIG. 8, the DC/DC converter 500, which is activated by receiving the cell selection signal from the GPIO 60, controls a duty ratio x in the switching of the switch 51 based on a target duty ratio transmitted via the COM 59. The DC/DC converter 500 transmits a value obtained by AD converting a current detection value of a current detected by the current detection circuit 61, and a value obtained by AD converting a voltage detection value of a voltage detected by the voltage detection circuit 62, to the cell selection circuit 400 via the COM 59.

The cell selection circuit 400 calculates a cell resistance value by the CPU 43 based on the current detection value and the voltage detection value transmitted from each of the DC/DC converters 500, and records the cell resistance value in a cell attribute list within the memory 44. The cell selection circuit 400 calculates an output power Pout of each of the DC/DC converters 500 by the CPU 43, based on the current detection value and the voltage detection value transmitted from each of the DC/DC converters 500.

The cell selection circuit 400 reads the operating time of each of the cells 200 from the timer 45, and updates the operating time stored in the cell attribute list (see, e.g., FIGS. 12A to 12D and 13). The cell selection circuit 400 updates the cell resistance value to the latest value as well as the operating time. The cell selection circuit 400 updates use priorities of the cells 200 based on the operating time or the cell resistance value. The cell selection circuit 400 increases the use priority as the operating time is shorter or the cell resistance value is lower.

For example, the cell selection circuit 400 calculates and updates the cell resistance value whenever the current value and the voltage value of the cell 200 are acquired. Accordingly, it is possible to properly determine the use priority of the cell 200. For example, the cell selection circuit 400 calculates and updates the cell resistance value of the cell 200 controlled by the DC/DC converter 500. Accordingly, the use priority of the cell 200 may be properly determined.

When increasing the number of cells 200 to be operated according to a change of a control target value provided from the MPPT control circuit 300, the cell selection circuit 400 selects the cell 200 having the highest use priority among the stopped cells 200, as a cell to be newly operated. Meanwhile, when decreasing the number of cells 200 to be operated according to a change of a control target value provided from the MPPT control circuit 300, the cell selection circuit 400 selects the cell 200 having the lowest use priority among the operating cells 200, as a cell whose operation is to be stopped. This may equalize burdens on the cells, which are caused by a load variation.

In the cell attribute list illustrated in FIGS. 12A to 12D and 13, an operating time, a cell current, a cell voltage, and a cell resistance value of a cell or a DC/DC converter are recorded, but a flag, etc. indicating a cell temperature or whether a cell is in use may also be stored. Accordingly, the cell selection circuit 400 may monitor the operation status of each of the cells 200 in more detail.

The life expectancy of the cell 200 may be determined by the cell resistance value. The cell selection circuit 400 may correct a target duty ratio to be supplied to the DC/DC converter 500, by the cell resistance value of the corresponding cell 200. Accordingly, even when the cell resistance value rises due to deterioration of the cell 200, it becomes possible to efficiently operate each of the DC/DC converters 500. This may suppress the lowering of the power conversion efficiency of the entire electrolytic system.

Figure 21:
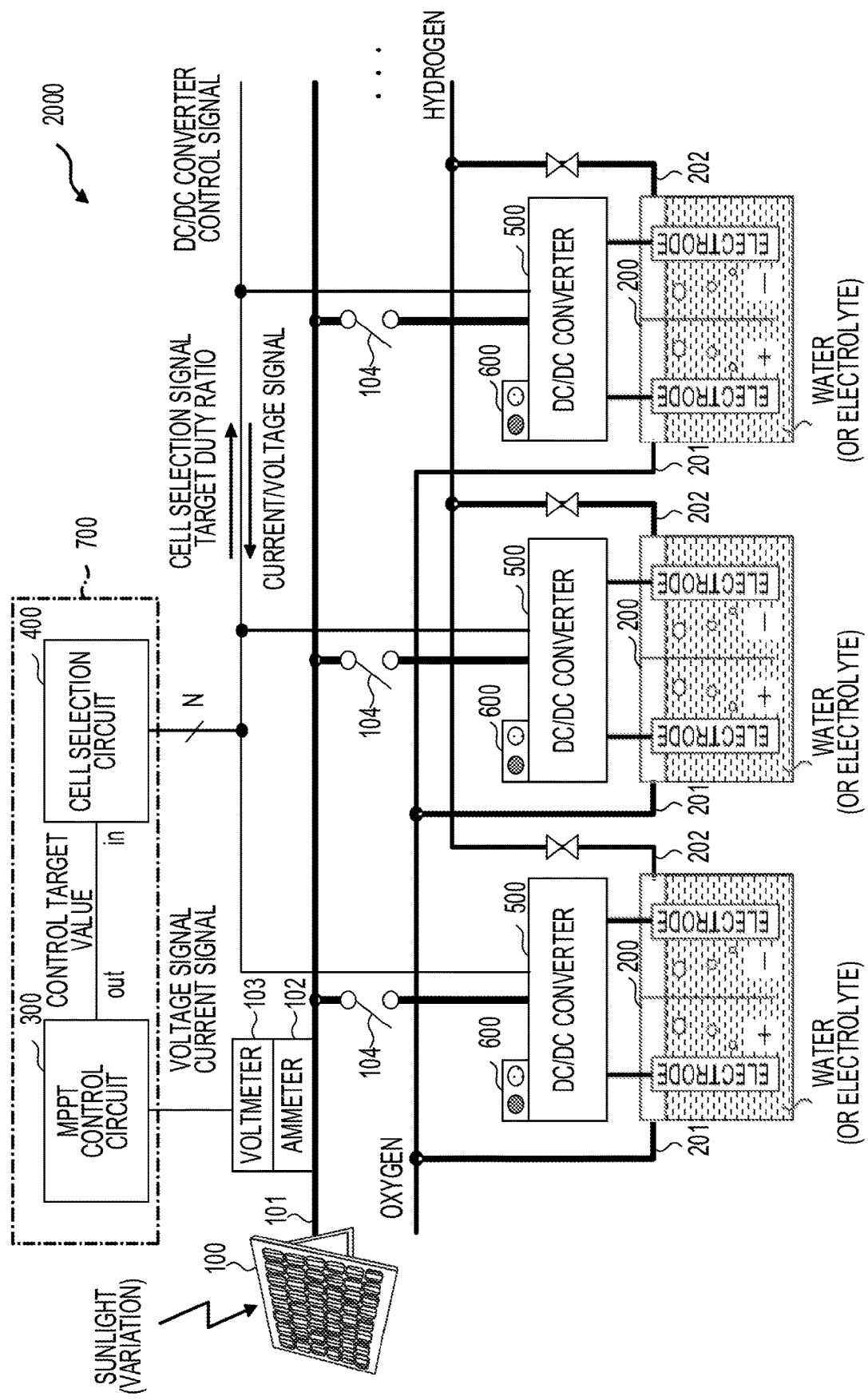
FIG. 21 is a view illustrating another example of a configuration of an electrolytic system according to the present disclosure.

FIG. 21 is a view illustrating another example of a configuration of an electrolytic system according to the present disclosure. In an electrolytic system 2000 illustrated in FIG. 21, an operation example of a case where a specific cell deteriorates and thus becomes unusable is illustrated.

The cell selection circuit 400 stops the cell 200 having a resistance value which exceeds a predetermined stop determination threshold value, among the plurality of cells 200. For example, when decreasing the number of cells 200 to be operated according to a change of a control target value provided from the MPPT control circuit 300, the cell selection circuit 400 stops a cell having a resistance value which exceeds the stop determination threshold value, and records an unusability flag (e.g., "F" in the field of the usability illustrated in FIG. 13) in a cell attribute list.

The cell selection circuit 400 separates the cell to be stopped, from the electrolytic system 2000. For example, the cell selection circuit 400 stops an operation of the DC/DC converter 500 controlling the corresponding cell, by using a cell selection signal, and/or separates the DC/DC converter 500 controlling the corresponding cell from the output line 101, by using a breaker 104.

The cell selection circuit 400 may generate an alarm indicating a deterioration of the cell to be stopped. The cell selection circuit 400 may cause the corresponding cell to continuously operate until a maintenance of the corresponding cell is performed.

At a time point where the maintenance of the deteriorated cell is completed, a cell operating time, a cell resistance value, and an unusability flag are manually or automatically initialized in the cell attribute list, and the operation of the cell is restored.

Accordingly, even when an individual cell deteriorates and thus becomes unusable, the electrolytic system 2000 itself is continuously operable, and thus it is possible to achieve improvement of the operation efficiency.

As described above, according to the present exemplary embodiment, since it becomes unnecessary to reconvert AC into DC by the AC/DC converter 94 as illustrated in FIG. 1, the power conversion efficiency is improved. Since the plurality of DC/DC converters 500 and the plurality of cells 200 may be selectively used by cell selection signals, even when, for example, one cell 200 deteriorates, it becomes possible to continuously perform an operation by using other cells 200.

The electrolytic system, the electrolytic control circuit, and the control method of the electrolytic system have been described above through the exemplary embodiment, but the present disclosure is not limited by the above exemplary embodiment. Various modifications and improvements such as a combination or a replacement with some or all of another exemplary embodiment are possible within the scope of the present disclosure.

For example, the power generator is not limited to a device that generates a power by using sunlight which is one of renewable energies, but may be a device that generates a power by using another renewable energy such as wind power.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An electrolytic system comprising:
a power generator configured to output a generated first DC power;
a plurality of converters each of the plurality of converters is configured to:
convert the first DC power output by the power generator into a second DC power according to a received target duty ratio, and
output voltage information of the second DC power and current information of the second DC power;
a plurality of electrolyzers each of the plurality of electrolyzers is configure to:
receive the second DC power output from each of the plurality of converters, and generate a gas;
a control circuit configured to execute control processing every time a start signal is inputted, the control processing including:
obtain a measurement value of the first DC power;
output control information by which the first DC power output by the power generator approaches a maximum power, based on the obtained measurement value of the first DC power;
in response to detecting that the measurement value at a present time is larger than the measurement value at a previous time, output the control information configured to cause a selection circuit to change the target duty ratio in a same direction as a changing direction at the previous time; and
in response to detecting that the measurement value at a present time is equal to or smaller than the measurement value at the previous time, output the control information configured to cause the selection circuit to change the target duty ratio in an opposite direction as the changing direction at the previous time; and the selection circuit configured to output the target duty ratio, and a selection signal as to whether to select each of the plurality of electrolyzers and each of the plurality of converters, based on the control information output by the control circuit and the voltage information and the current information output by each of the plurality of converters.

2. The electrolytic system according to claim 1, wherein the selection circuit selects a converter for which a duty ratio is to be changed by a specified change amount, among the plurality of converters.

3. The electrolytic system according to claim 1, wherein the selection circuit selects a converter for which a duty ratio is to be changed, among the plurality of converters, according to a parameter calculated based on the voltage information and the current information output by each of the plurality of converters.

4. The electrolytic system according to claim 1, wherein the control information is a control target value corresponding to a value of a change amount Δx of a duty ratio x.

5. The electrolytic system according to claim 1, wherein the selection circuit selects an electrolyzer having a highest use priority among stopped electrolyzers when increasing a number of electrolyzers to be operated, and selects an electrolyzer having a lowest use priority among operating electrolyzers when decreasing a number of electrolyzers to be operated.

6. The electrolytic system according to claim 1, wherein the selection circuit outputs the selection signal according to an attribute of each of the plurality of electrolyzers.

7. The electrolytic system according to claim 6, wherein the attribute is a resistance value, and the selection circuit outputs the selection signal such that an electrolyzer in which the resistance value is smaller, among the plurality of electrolyzers, is preferentially operated.

8. The electrolytic system according to claim 6, wherein the attribute is an operating time, and the selection circuit outputs the selection signal such that an electrolyzer in which the operating time is shorter, among the plurality of electrolyzers, is preferentially operated.

9. The electrolytic system according to claim 7, wherein the selection circuit corrects the target duty ratio according to the resistance value of each of the plurality of electrolyzers.

10. The electrolytic system according to claim 7, wherein the selection circuit generates an alarm corresponding to the electrolyzer having the resistance value exceeding a threshold value, among the plurality of electrolyzers.

11. The electrolytic system according to claim 7, wherein the selection circuit stops the electrolyzer having the resistance value exceeding a threshold value, among the plurality of electrolyzers.

12. An electrolytic control circuit that controls, a plurality of converters each of the plurality of converters is configured to convert a first DC power received from a power generator into a second DC power according to a received target duty ratio, and output voltage information of the second DC power and current information of the second DC power, and a plurality of electrolyzers each of the plurality of electrolyzers is configured to receive the second DC power output from each of the plurality of converters and generate a gas, the electrolytic control circuit comprising:
 a control circuit configured to execute control processing every time a start signal is inputted, the control processing including:
  obtain a measurement value of the first DC power;
  output control information by which the first DC power output by the power generator approaches a maximum power, based on the obtained measurement value of the first DC power;
  in response to detecting that the measurement value at a present time is larger than the measurement value at a previous time, output the control information configured to cause a selection circuit to change the target duty ratio in a same direction as a changing direction at the previous time; and
  in response to detecting that the measurement value at a present time is equal to or smaller than the measurement value at the previous time, output the control information configured to cause the selection circuit to change the target duty ratio in an opposite direction as the changing direction at the previous time; and
 the selection circuit configured to output the target duty ratio, and a selection signal as to whether to select each of the plurality of electrolyzers and each of the plurality of converters, based on the control information output by the control circuit and the voltage information and the current information output by each of the plurality of converters.

13. The electrolytic control circuit according to claim 12, wherein the selection circuit selects a converter for which a duty ratio is to be changed by a specified change amount, among the plurality of converters.

14. The electrolytic control circuit according to claim 12, wherein the selection circuit selects a converter for which a duty ratio is to be changed, among the plurality of converters, according to a parameter calculated based on the voltage information and the current information output by each of the plurality of converters.

15. A control method for electrolytic system including a power generator, a plurality of converters, a plurality of electrolyzers, a control circuit, and a selection circuit, the method comprising:
 converting, by each of the plurality of converters, a first DC power output by the power generator into a second DC power according to a received target duty ratio;
 outputting, by each of the plurality of converters, voltage information of the second DC power and current information of the second DC power;
 receiving, by each of the plurality of electrolyzers, the second DC power output from each of the plurality of converters;
 generating a gas, by each of the plurality of electrolyzers;
 executing, by the control circuit, control processing every time a start signal is inputted, the control processing including:
  obtaining a measurement value of the first DC power;
  outputting, by the control circuit, control information by which the first DC power output by the power generator approaches a maximum power, based on the obtained measurement value of the first DC power;
  in response to detecting that the measurement value at a present time is larger than the measurement value at a previous time, outputting the control information configured to cause the selection circuit to change the target duty ratio in a same direction as a changing direction at the previous time; and
  in response to detecting that the measurement value at a present time is equal to or smaller than the measurement value at the previous time, outputting the control information configured to cause the selection circuit to change the target duty ratio in an opposite direction as the changing direction at the previous time; and
 outputting, by the selection circuit, the target duty ratio, and a selection signal as to whether to select each of the plurality of electrolyzers and each of the plurality of converters, based on the control information output by the control circuit, the voltage information and the current information output by each of the plurality of converters.

16. The control method according to claim 15, wherein the selection circuit selects a converter for which a duty ratio is to be changed by a specified change amount, among the plurality of converters.

17. The control method according to claim 15, wherein the selection circuit selects a converter for which a duty ratio is to be changed, among the plurality of converters, according to a parameter calculated based on the voltage information and the current information output by each of the plurality of converters.

* * * * *